United States Patent

Murai et al.

[11] Patent Number: 5,635,958
[45] Date of Patent: Jun. 3, 1997

[54] INFORMATION INPUTTING AND PROCESSING APPARATUS

[75] Inventors: Katsumi Murai, Moriguchi; Kenji Hashimoto, Kadoma, both of Japan

[73] Assignee: Matsushita Electric Industrial Co., Ltd., Osaka, Japan

[21] Appl. No.: 160,881

[22] Filed: Dec. 3, 1993

[30] Foreign Application Priority Data

Dec. 9, 1992 [JP] Japan .................. 4-329484

[51] Int. Cl.$^6$ .................................. G09G 5/00
[52] U.S. Cl. .................. 345/168; 341/22; 400/490; 364/709.12
[58] Field of Search .................. 345/157, 168; 340/407; 341/21, 22, 24, 28, 31–34; 200/5 R; 400/490; 364/709.11, 709.12

[56] References Cited

U.S. PATENT DOCUMENTS

| | | |
|---|---|---|
| 3,693,123 | 9/1972 | Pedersen . |
| 3,740,744 | 6/1973 | Nakada et al. ............... 341/31 |
| 4,459,678 | 7/1984 | McCaskill et al. . |
| 4,510,583 | 4/1985 | Walz et al. . |
| 4,543,564 | 9/1985 | Andoria et al. ............... 341/24 |
| 4,704,601 | 11/1987 | Engstrom ............... 341/24 |
| 4,862,166 | 8/1989 | Yamakawa ............... 341/22 |
| 5,341,133 | 8/1994 | Savory et al. ............... 345/168 |
| 5,347,275 | 9/1994 | Lau ............... 341/31 |

FOREIGN PATENT DOCUMENTS

| | | |
|---|---|---|
| 3108028 | 11/1983 | Germany . |
| 59-160225 | 10/1984 | Japan . |

*Primary Examiner*—Richard Hjerpe
*Assistant Examiner*—Amare Mengistu
*Attorney, Agent, or Firm*—Watson Cole Stevens Davis P.L.L.C.

[57] ABSTRACT

An apparatus for inputting and processing information through a keyboard comprises sensors for detecting that fingers of an operator have contacted with or approached keys on the keyboard, a signal processing device for inputting and processing the detection information from the sensors and information from switch circuits which are turned on or off upon operation of the keys on the keyboard, and a display unit for displaying the detection information from the sensors and the information from the switch circuits as information symbols, respectively, whereby a keyboard entry operation by the operator is made easy and comfortable, and, as a result, it becomes possible to prevent occurrence of a key entry error and to reduce the number of times of key operations.

2 Claims, 28 Drawing Sheets

FIG.30

I was V ▉

| very | viciou | votted |
|------|--------|--------|
| variou | virtuo | vital |
| virgin | vivaci | victor |
| vigoro | volati | verita |

10

INFORMATION INPUTTING AND PROCESSING APPARATUS

BACKGROUND OF THE INVENTION

The present invention relates to an apparatus for inputting and processing character and image information, or more particularly to an information inputting and processing apparatus in which an input operation can be performed easily and comfortably even by one hand, and a key entry error can be prevented.

In recent years, with the widespread use of personal computers, more and more documents have come to be disposed of electronically. Not everyone, however, has an ability to operate a keyboard, nor are there many persons who can make rapid entry in the keyboard by blind touch. The arrangement of keys of keyboards currently in use is made with no special identification of respective keys nor to have any logical connection between the keys, and therefore the keytop arrangement thereof is difficult to remember. The recent trend is toward directly operable interfaces such as a mouse and the like. In extreme cases, information entry or information access is made possible without using a keyboard. Nevertheless, a keyboard remains as the best means for making entry of characters. Further, many kinds of pen entry have been proposed, but they pose a problem of entry speed, and therefore they have not yet formed a mainstream in this field.

Also, keyboards mainly in use are of the ASCII system arrangement, and new keyboard arrangements have yet come to be accepted. Conventional keyboard and mice, however, are not suitable as means for entering information into TV, etc. with one hand, while the other hand is engaged in any other work.

In order to reduce the number of keys on the keyboard, it is necessary to express each code by a combination of a plurality of keys and to assign a plurality of codes to each key. It is often said, however, that assignment of a plurality of codes to each key makes it difficult to remember the key arrangement. For beginner users, who are used to learn key positions while tracing letters on keytops by the eye, a complicated keyboard system is a great barrier to their effort in such a case, and makes it difficult for them to become skilled in blind touch in a shorter period of time. Users, who operate the keyboard for the purpose of doing their job, may be eager to learn the key positions, but for the use by users in home or for use in entertainment, the users will be less motivated to remember the key positions.

SUMMARY OF THE INVENTION

The object of the invention is to provide an apparatus for making comfortable information entry in all situations by offering a user key information or key position information in advance of a key operation of the user thereby to assist the user in performing a blind touch operation and to reduce an opportunity of making an erroneous key operation, or to make the user's one-hand operation possible.

In order to solve the above-mentioned problems, according to the present invention, there is provided an information inputting and processing apparatus comprising means for sensing a touch or proximity of a finger of a user on all or a part of the keytops of each key switch circuit. In other words, the kind of a key under the operation of the user is indicated, thereby informing the user whether the particular key is the one intended to be operated by the user, before the keyboard switch is turned on or off. Then, the user's operation, if continued, turns on or off the switch circuit.

Also, according to the present invention, a plurality of thumb proximity sensors are disposed at a lower position of the surface of a key group (viewed from the front) so that one of the thumb proximity sensors is designated by detecting approach or contact of the thumb, while, one of the keys in the key group is designated by the other four fingers, whereby the designation of one of the thumb proximity sensors and that of one of the keys in the key group is combined together to perform a key operation, thereby entering information.

Thus, according to the present invention, a user, who intends to make entry through a keyboard, watches only a display screen, without looking straight at keytops, because the intended key is displayed around the character string which is inputted on the basis of the operator's peripheral visual and perceptional sense. In addition, since the display itself provides a guide separate from information entry, the psychological pressure based on an anxiety that a key depression, once made, might become unrestorable is removed. Further, at the time of ordinary key entry, an intended character is displayed in advance and fed back, thereby preventing erroneous key entry. Furthermore, according to the present invention, the key group is operated by the four fingers including the forefinger, the middle finger, the third finger and the little finger, while the thumb is made to approach a group of thumb proximity sensors arranged at a lower position with respect to the key group to designate one of the thumb proximity sensors. It is psychologically natural that the range of movement of the thumb be located below the other four fingers, so that no unnatural force is exerted on the muscle. In addition, the fatigue of a user is reduced in view of the fact that the thumb position is entered by a proximity sensor forcelessly, with the other keys being operated at the same time with the thumb operation easily with the same degree of force as the operation of a 10-key pad.

BRIEF DESCRIPTION OF THE DRAWINGS

FIG. 30 shows a display screen of a word processor for an information inputting and processing apparatus of an embodiment of the present invention.

DESCRIPTION OF THE PREFERRED EMBODIMENTS

Embodiments of the present invention will be explained in detail hereunder with reference to the accompanying drawings.

Figure 1:
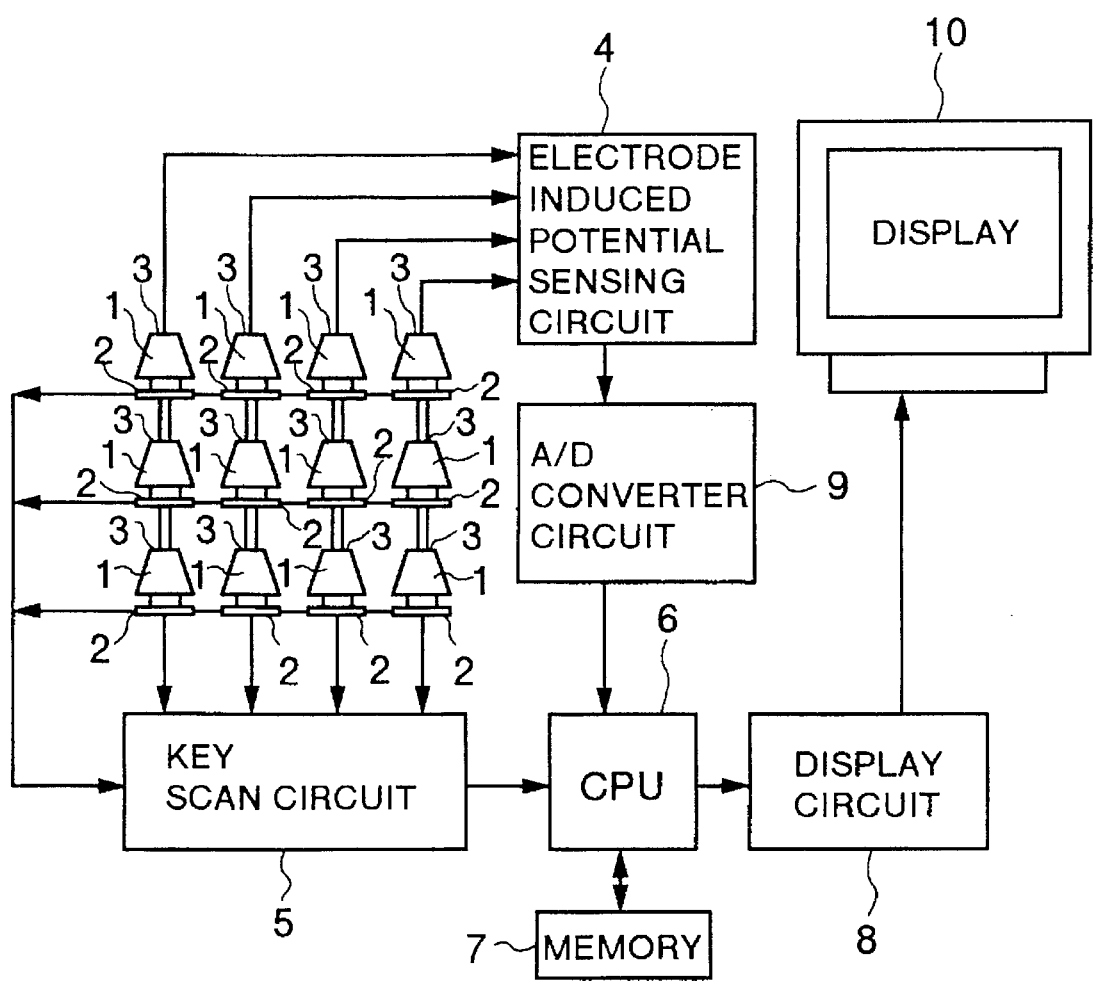
FIG. 1 is a functional block diagram showing an information inputting and processing apparatus of an embodiment of the present invention.

FIG. 1 is a functional block diagram showing an information inputting and processing apparatus of a first embodiment of the present invention. In FIG. 1, reference numeral 1 designates key tops, 2 key switches, 3 electrodes, 4 a sensing circuit for amplifying the electrostatic potential induced in the electrodes, 5 a key scan circuit, 6 a microcomputer, 7 a memory circuit, 8 a display circuit, 9 an A/D converter circuit, and 10 a display. Assuming that a finger has touched or approached a specific key 1, induction potential is generated in the corresponding electrode 3. The potential at each of the keytops 1 schematically shown in FIG. 1 (12 keytops in the drawing) is amplified by the sensing circuit 4, subjected to time-division multiplex processings, and inputted into the A/D converter 9. The outputs thus inputted are compared with each other, whereby the microcomputer can specify the key touched or approached to the nearest degree by the finger. These processings can be executed by time-division processings of an ordinary personal computer (such as a word processor).

Figure 2:
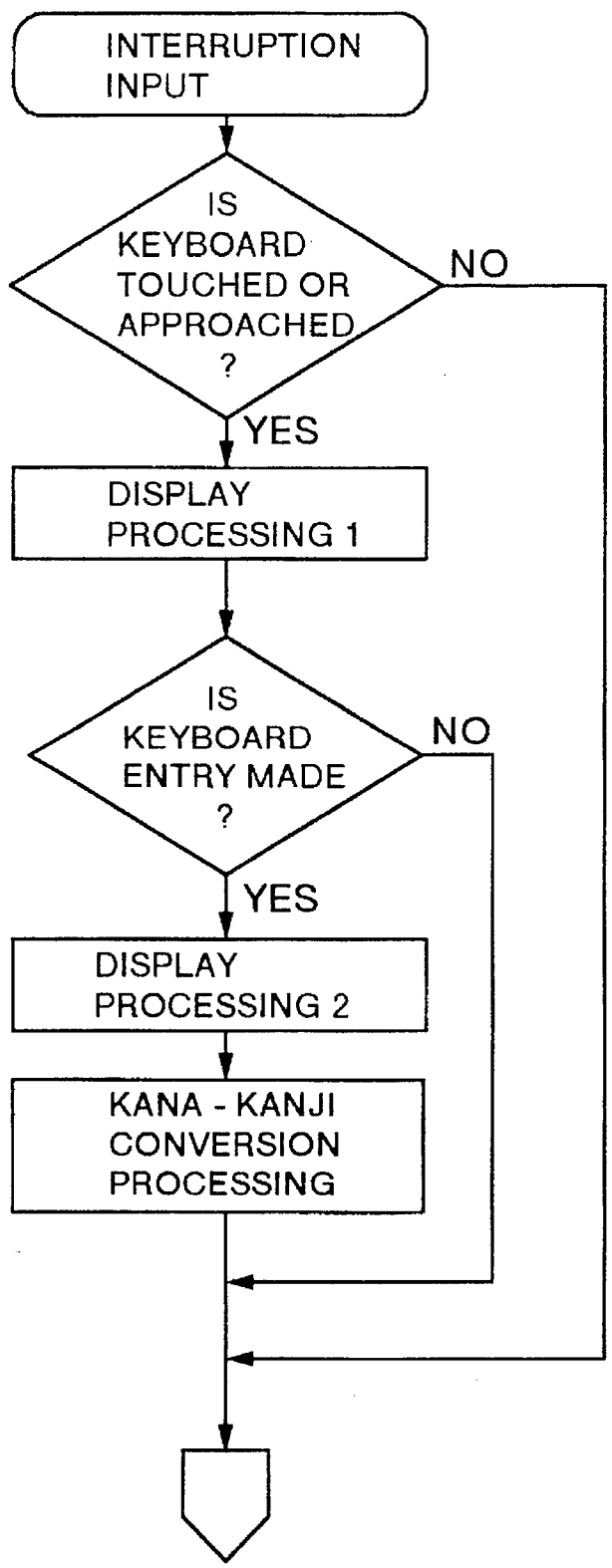
FIG. 2 shows the processing steps of a microcomputer for an information inputting and processing apparatus of an embodiment of the present invention.
Figure 3:
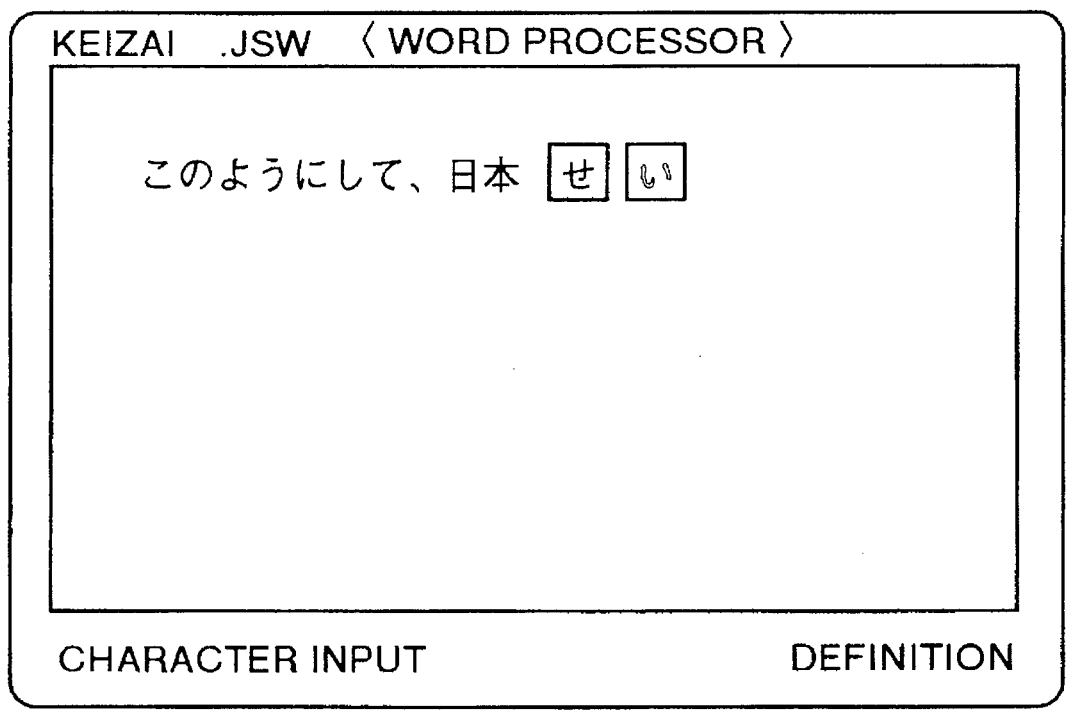
FIG. 3 shows a display screen of a word processor for an information inputting and processing apparatus of an embodiment of the present invention.

FIG. 2 shows a part of the processing steps of the microcomputer, which is a Japanese-language word processor. This is an interrupt handling process, including two display operations, i.e., a display operation (display operation 1) of displaying the result of making a decision as to whether the keytop is touched or approached by the finger, at regular time intervals, and a display operation (display operation 2) of displaying the result of making a decision as to whether a key entry has been made actually from the keyboard. The display operation 2 is similar to a character input display of the conventional word processor. In the display operation 1, the operator is required to display a character being inputted by himself/herself at the end of a defined text (a step called definition is required, since it is necessary for a Japanese-language word processor to convert Kana into Kanji) in advance of actual character entry. The operator watches a defined text in the central visual field and characters of the display operation 1 in the peripheral visual field. FIG. 3 shows a display screen of a Japanese word processor, in which a character touched or approached by the user's finger is indicated in a different color and in an inverse background at the last end of the text being inputted. The indication of this display operation 1, which provides a guide separate from an information input, disappears when the finger is released. A character not defined is displayed in an immediately-preceding position. In this example which shows entry of a Japanese language, a conversion portion is separately indicated particularly for making a conversion into Kanji (the last character but one). This indication is not required for languages such as English.

Figure 4:
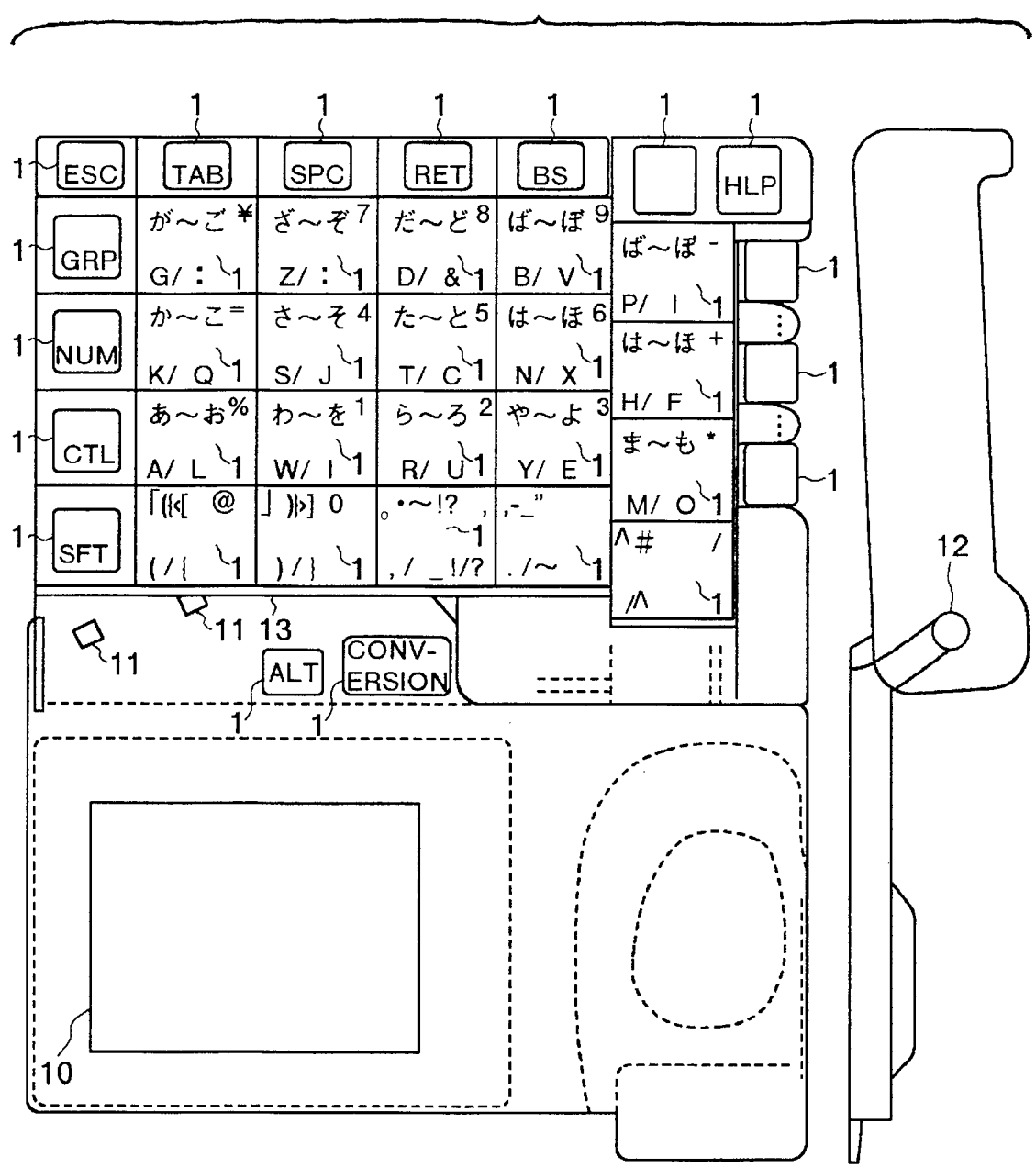
FIG. 4 is an external view of an information inputting and processing apparatus of an embodiment of the present invention.

FIG. 4 is a top surface and a side view showing the outline of an information inputting and processing apparatus of another embodiment of the present invention. In FIG. 4, numeral 1 designates a group of keytops, 10 a display, 11 photosensors, 12 a hinge, and 13 a thumb insertion hole formed below the keytops. Three other photosensors 11, though not shown in the drawing, are provided in the thumb insertion hole 13. The operator, placing the palm of his/her hand in a depression formed on the right side of the display 10, inserts and moves his/her thumb in the thumb insertion hole 13 thereby to approach and select one of the five sensors 11 arranged in an arcuate form. Each keytop corresponds to five characters. The photosensors 11 sense a thumb position, and the positional information associated with one of them having a highest output signal level is selected. Then, by combining the selected positional information with the key operation information for a keytop in the keytop group, one character symbol is selected.

Figure 5:
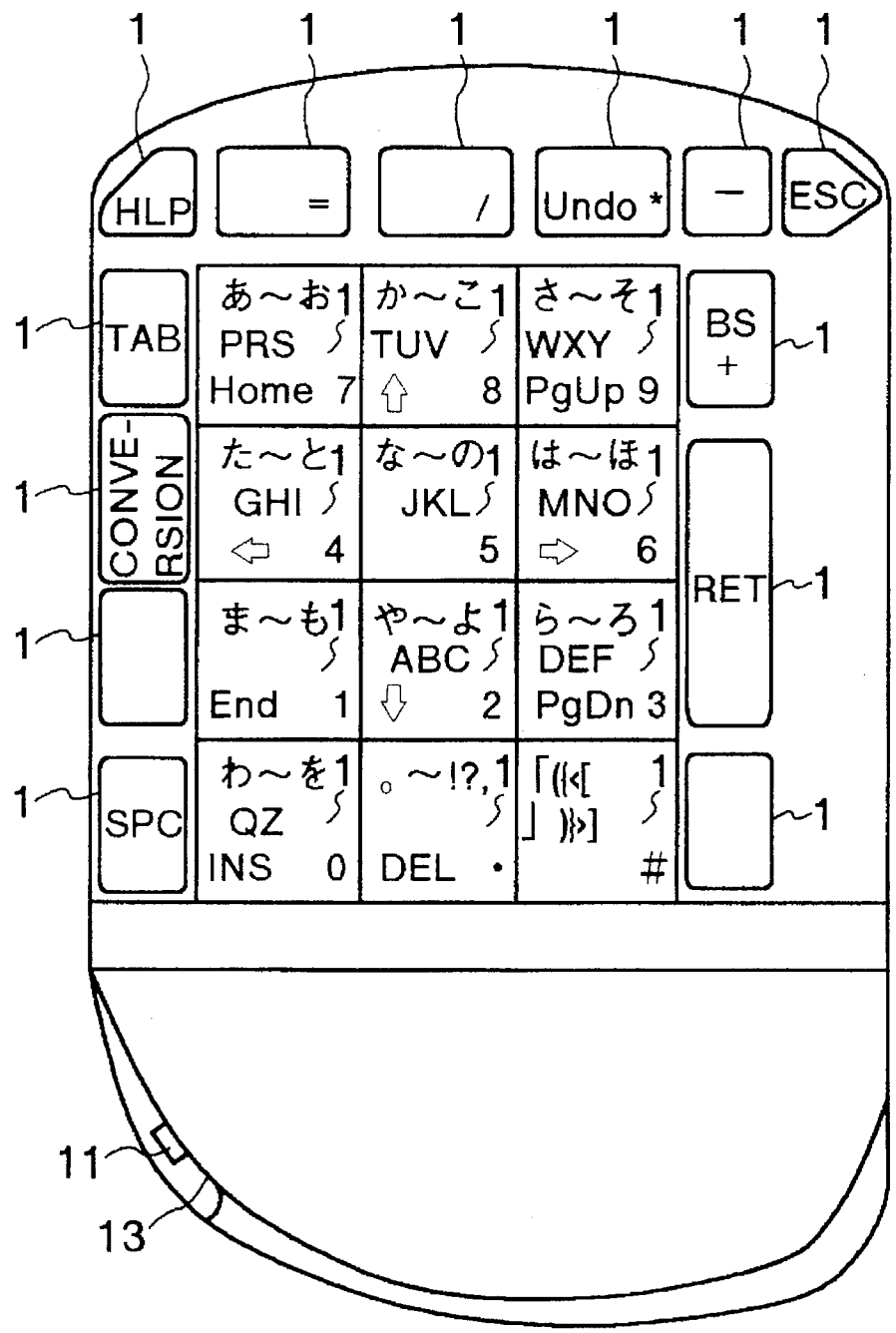
FIG. 5 is an external view of an information inputting and processing apparatus of an embodiment of the present invention.

The information inputting and processing apparatus of another embodiment is shown in FIG. 5. In FIG. 5, numeral 1 designates keytops, 13 a thumb insertion hole arranged below the keytops, and 11 a photosensor. The operator inserts his/her thumb into the thumb insertion hole 13 in the side direction, while at the same time clicking the keytops 1 by the remaining four fingers.

Figure 6:
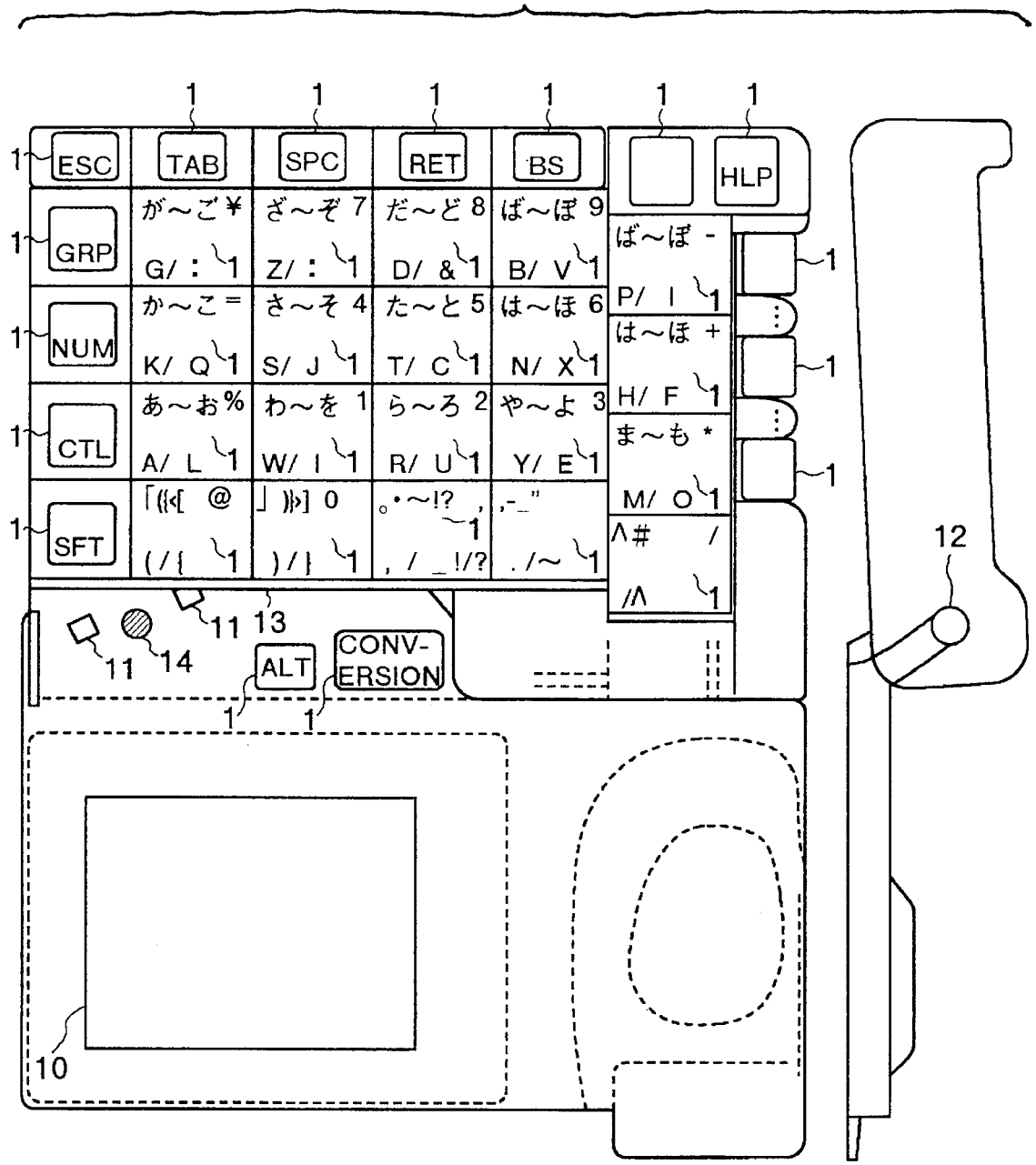
FIG. 6 is an external view of an information inputting and processing apparatus of an embodiment of the present invention.

The information inputting and processing apparatus of still another embodiment is shown in FIG. 6. In FIG. 6, numeral 14 designates a protrusion and numeral 11 photosensors. The operator touches the protrusion 14 each time the thumb is moved and thus can recognize the position of the photosensors 11.

Figure 7:
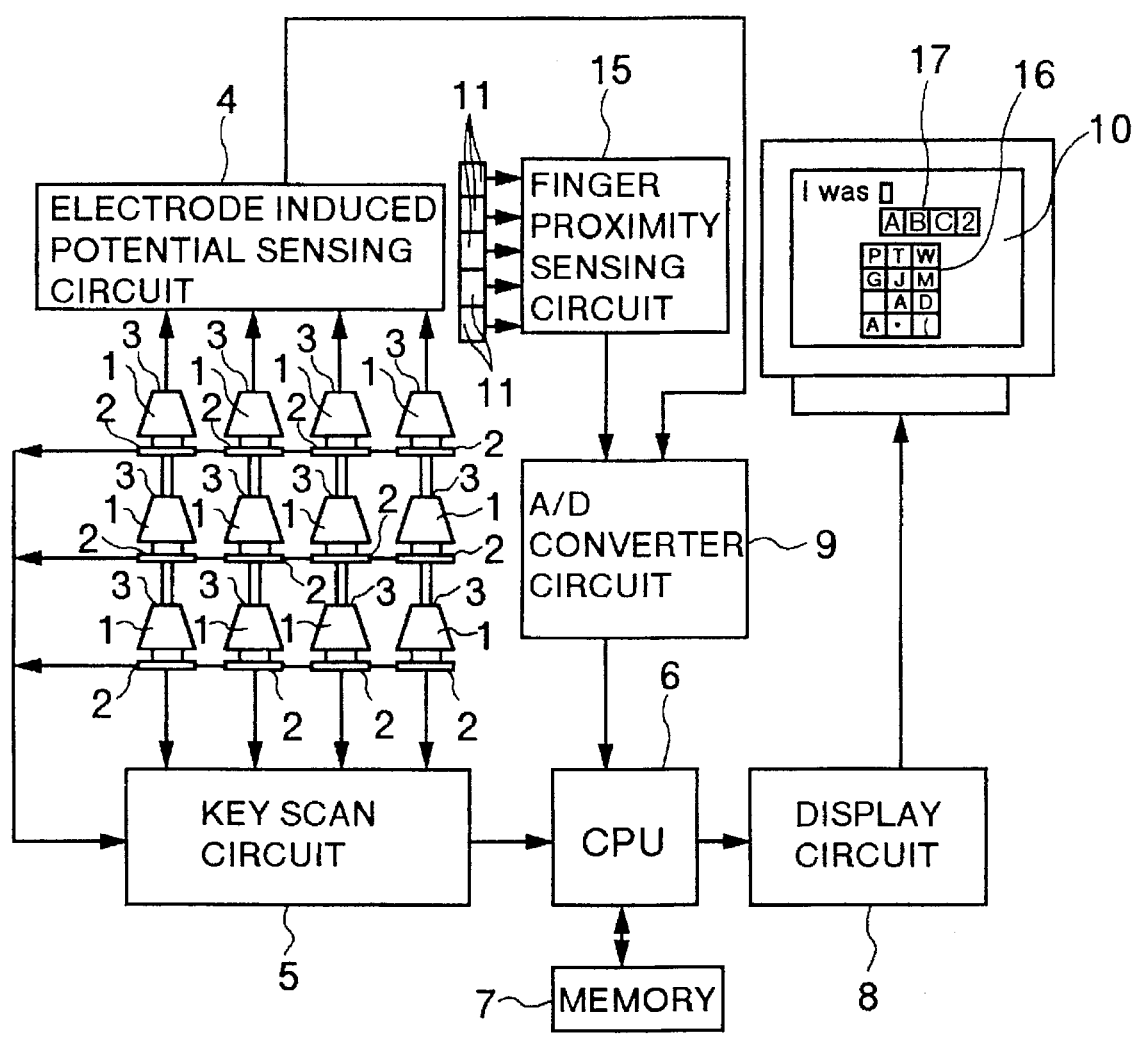
FIG. 7 is a functional block diagram showing an information inputting and processing apparatus of an embodiment of the present invention.

The information inputting and processing apparatus of a further embodiment is shown in the functional block diagram of FIG. 7. In FIG. 7, numeral 15 designates a sensor circuit for sensing the approach of a finger, 16 a screen showing the physical location of the keytops 1 indicated on the display, and 17 a display screen indicating the position of the thumb sensed by the photosensors 11. The proximity of a finger to the electrode 3 is notified from the sensor circuit 4 through an A/D converter 9 to a CPU 6. Numeral 11 designates the photosensors for sensing the proximity of the thumb. The character entry by the operator is effected by using a combination of the position of the thumb and the type of the keytops 1. When a specific one of the electrodes 3 is touched or approached by a finger, the portion of the keytop arrangement screen 16 associated with the specific key position is displayed in bright color. In the drawing, the position "A", which is touched by the finger, is displayed brightly. This indicates that the finger is placed on the keytop on the third row from top in the second column from left of the central keypad in FIG. 5 and also that selection of one of the letters "A", "B" and "C" is attempted. Also, a rectangular bright marker is moved to indicate a letter to be selected brightly at the thumb position over the screen portion 17. The marker is located over "B" in the case under consideration. Strong depression of the keytop corresponding to the letter intended by the operator, therefore, closes a corresponding switch 2 and causes the actual letter "B" to be entered. The display 10 indicates the result of execution of the software of the word processor. The coordinate information of the cursor is periodically acquired by the computer 6, and the displays 16 and 17 are located immediately below the character entry cursor in the screen.

Figure 8:
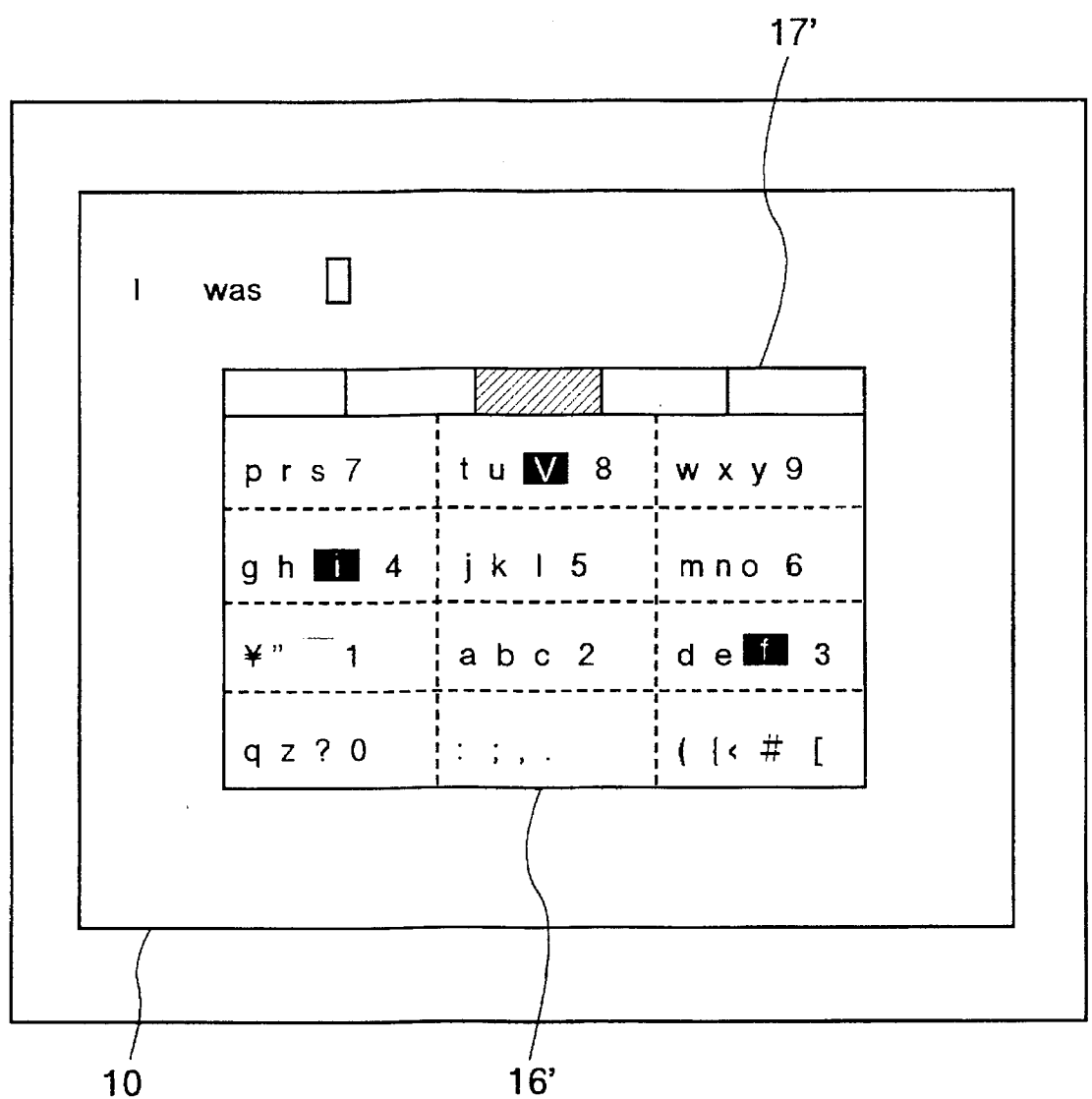
FIG. 8 shows a display screen of a word processor for an information inputting and processing apparatus of an embodiment of the present invention.

Still another embodiment is shown in FIG. 8. In FIG. 8, numeral 10 designates a display screen, 16' a screen display corresponding to the physical positional arrangement of the keytops, and 17' a display screen corresponding to the physical position of the thumb. In FIG. 8, four assigned characters are indicated at the places corresponding to the physical positions of the keytops, each of which is combined with the thumb position to select one of the four characters at the time of key operation. In the case under consideration, the thumb is shown located on the third sensor from left in the display section 17', while in the display section 16', the forefinger is in proximity to the second keytop from top in the left column, the middle finger in proximity to the top row in the middle column, and the third finger in proximity to the third row in the right column, each position being indicated in a bright frame. Further, the characters "i", "v" and "f" are displayed in the enlarged bright form in an inverse background, which are presented as characters selected in combination with the thumb.

Figure 9:
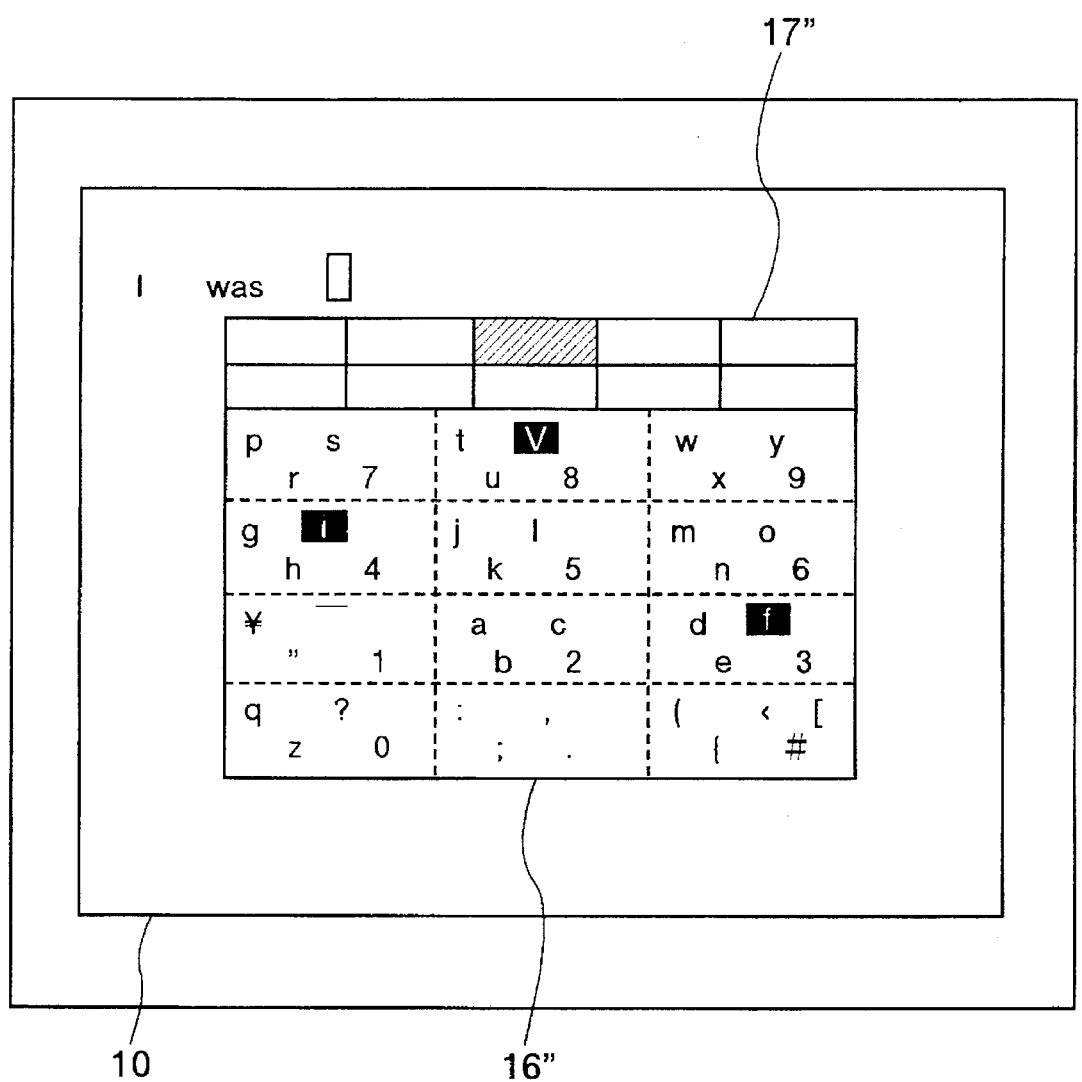
FIG. 9 shows a display screen for an information inputting and processing apparatus of an embodiment of the present invention.

Now, another embodiment is shown in FIG. 9. In FIG. 9, numeral 10 designates a display screen, 16" a screen corresponding to the physical arrangement of keytop positions displayed, and 17" a display screen corresponding to the physical position of the thumb. The four characters assigned to each keytop are indicated in staggered fashion, so that one of the four characters is selected in combination with the thumb at the time of key operation. This staggered arrangement can shorten the horizontal length of indication.

Still another embodiment will be explained with reference to FIG. 10.

Figure 10:
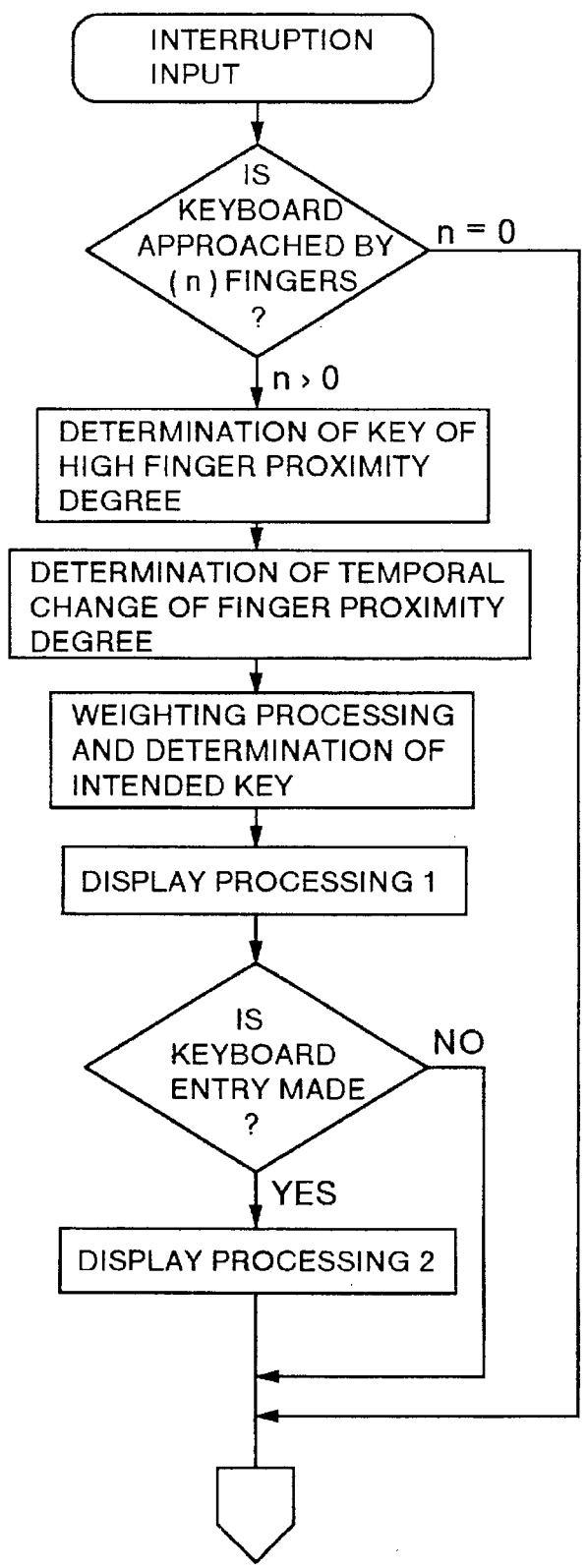
FIG. 10 shows the processing steps of a microcomputer for an information inputting and processing apparatus of an embodiment of the present invention.

FIG. 10 shows a part of the processing steps executed by the microcomputer operating on a word processor software. This assumes a case in which a plurality of keytops are approached by a plurality of fingers in the circuit of FIG. 1. This process is triggered by a timer interrupt of the microcomputer 6. In the case where each keytop is approached by a finger, that is, where a sensing input equal to or larger than a specified value is obtained, the output value is listed up representing a large degree of proximity (proximity degree) among the outputs produced from a sensing circuit 4. Also, the key intended to be operated is decided and displayed by determining the temporal change and the direction of movement of proximity degree to adjacent keytops, by making a comparison with the signal output in a steady condition or by computing the weight of the physical position thereof. The weighting data are, for example, associated with the fact that a finger placed at the home position key will not be moved frequently, or that the finger construction is such that an attempt to move the middle finger or the third finger will move the forefinger or the little finger, respectively. Events related to these cases are stored also in memory as weighting data with the weight thereof adapted to be changed by learning. Also, the proximity degree is determined for a plurality of electrodes approached when the proximity degree (contact) changes or a finger approaches an electrode from a high distant position, and the letter on the key expected to be reached is displayed under the screen cursor as a candidate, that is, as a tentative substitute. By making display in this way, the operator is able to visually recognize the letter intended to be operated a considerable time before the fingers come into contact with keytops. Of course, the letter on display is not entered in the word processor before a corresponding key is actually clicked.

Figure 11:
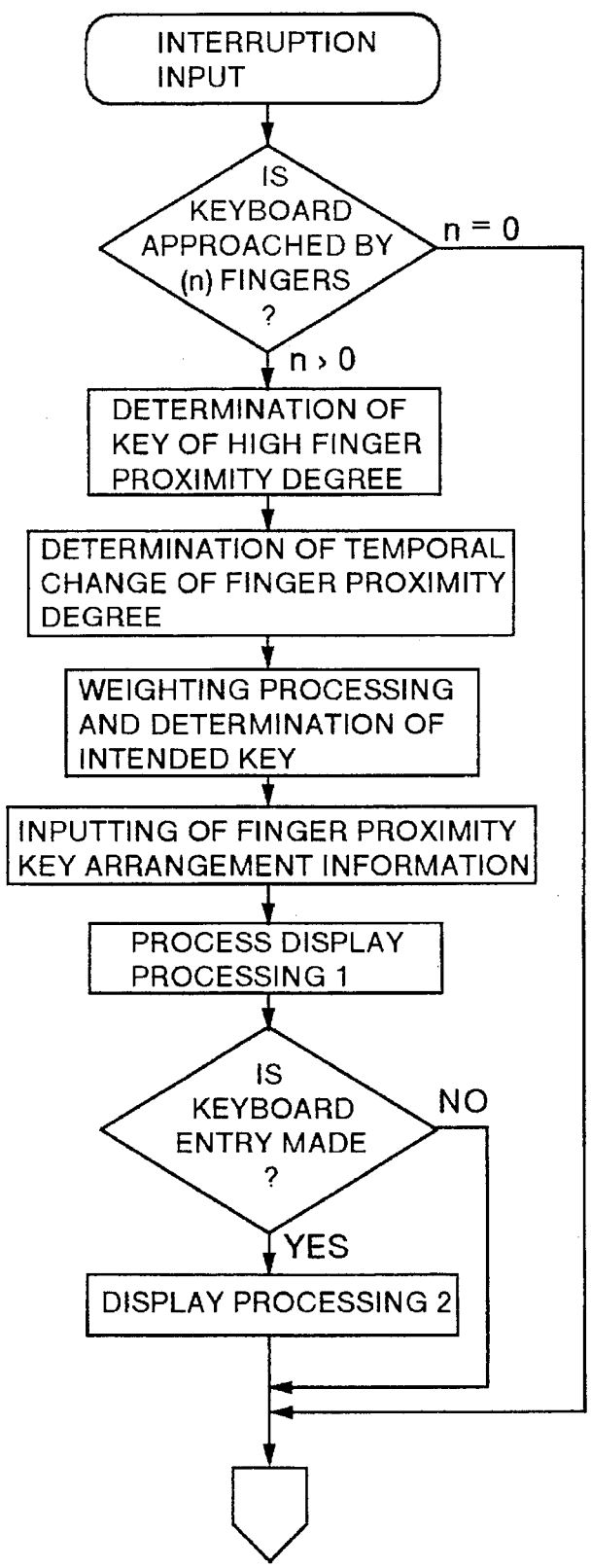
FIG. 11 shows the processing steps of a microcomputer for an information inputting and processing apparatus of an embodiment of the present invention.
Figure 12A:
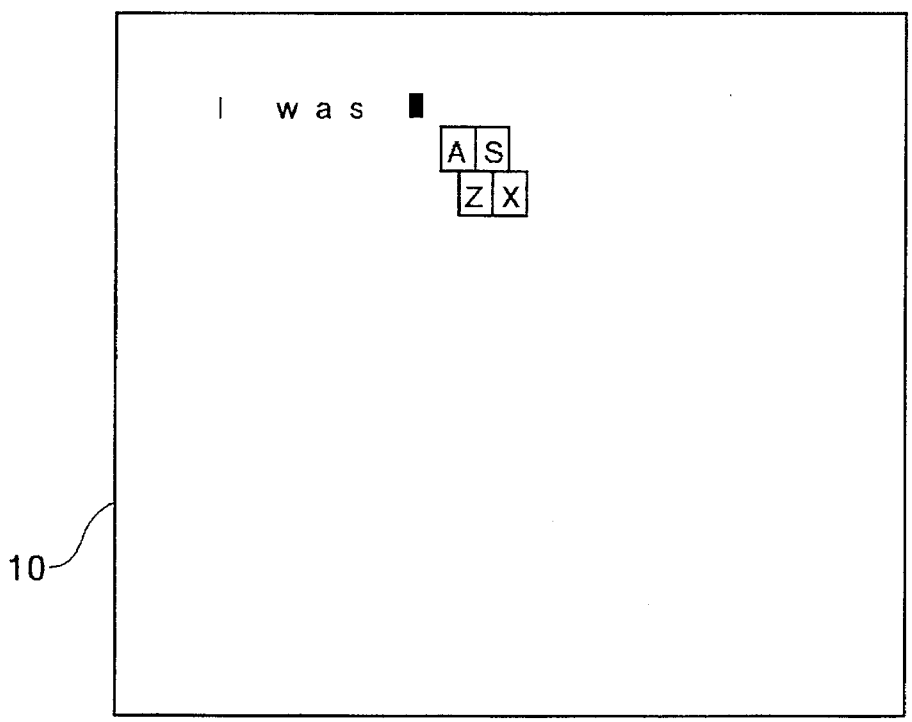
FIGS. 12A and 12B respectively show display screens of a word processor for an information inputting and processing apparatus of an embodiment of the present invention.
Figure 12B:
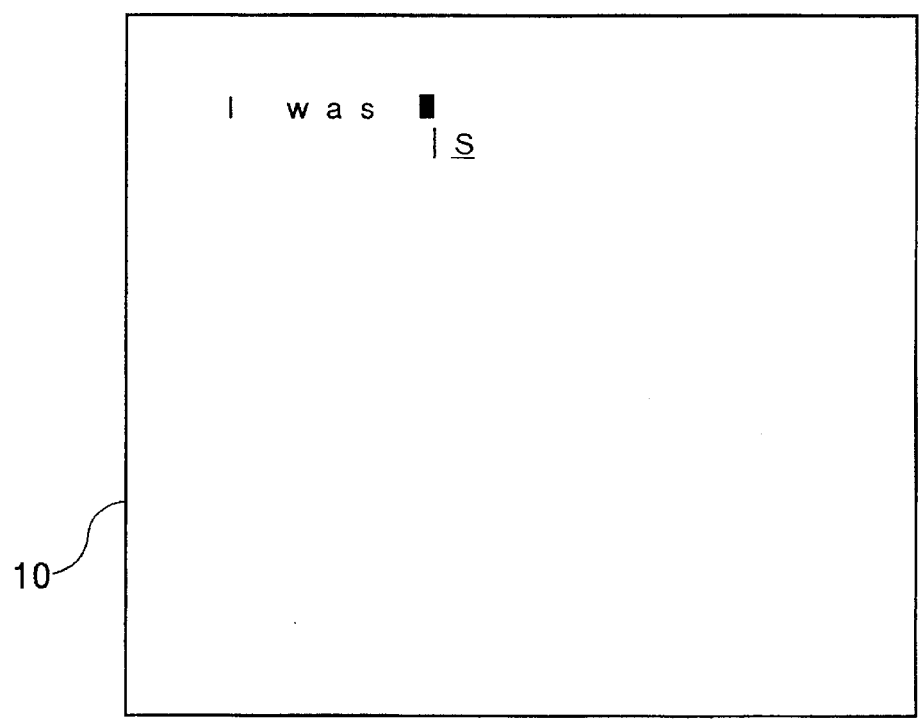

A further embodiment will be explained with reference to FIGS. 11, 12A and 12B. FIG. 11 shows a part of the processing steps of a microcomputer which is executing the word processing program. More precisely, FIG. 11 shows a specific operational condition of the electronic circuit of the functional block diagram shown in FIG. 1. That is, FIG. 11 assumes an operating case of the electronic circuit shown in FIG. 1 in which a plurality of fingers are in proximity to a plurality of keytops. This process is assumed to have been triggered by the timer interrupt of the microprocessor 6 so that a plurality of fingers are in contact or proximity with a plurality of keytops. This process, which is basically similar to that of FIG. 10, is not intended to display only a single letter which is determined to be most desirable for key operation, but also to display its surrounding keytops as well when a finger is close to a plurality of keytops. A memory 7 has stored therein information on proximity arrangement of keys, and the letters around a key determined for intended operation are displayed on the screen. FIG. 12A is a screen showing the execution of the word processor program, which indicates that a finger is in proximity to the letters "A", "S", "Z" and "X" on an ASCII-type keyboard. In other words, the finger is located in the boundary of these keytops, and the whole of these characters is displayed in such a manner as to be swayed as the operator jogs his/her finger. Instead of this method of display indicating relative physical positions of the characters swayed in bitmap fashion, only the intended character may be displayed as shown in FIG. 12B with marks indicating the relative positions of the displaced finger. Such an indication is made by drawing a vertical bar to the left of and an underline below the "S", thus informing the operator that the particular finger is positioned near to "A" and "X". The operator is thus urged to relocate the finger to a position where the marks disappear. This displacement may be indicated alternatively by a color in place of marks.

Figure 13:
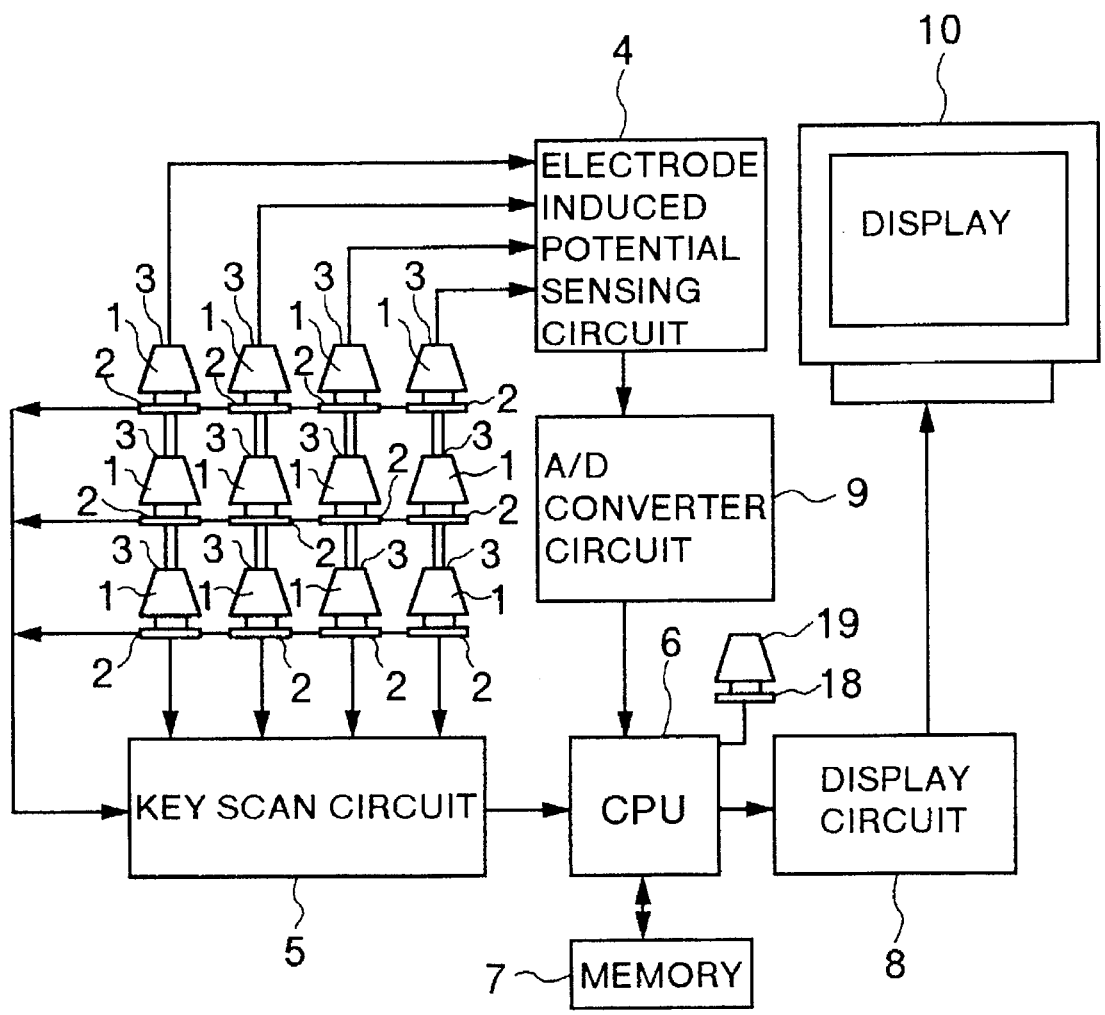
FIG. 13 is a functional block diagram showing an information inputting and processing apparatus of an embodiment of the present invention.
Figure 14:
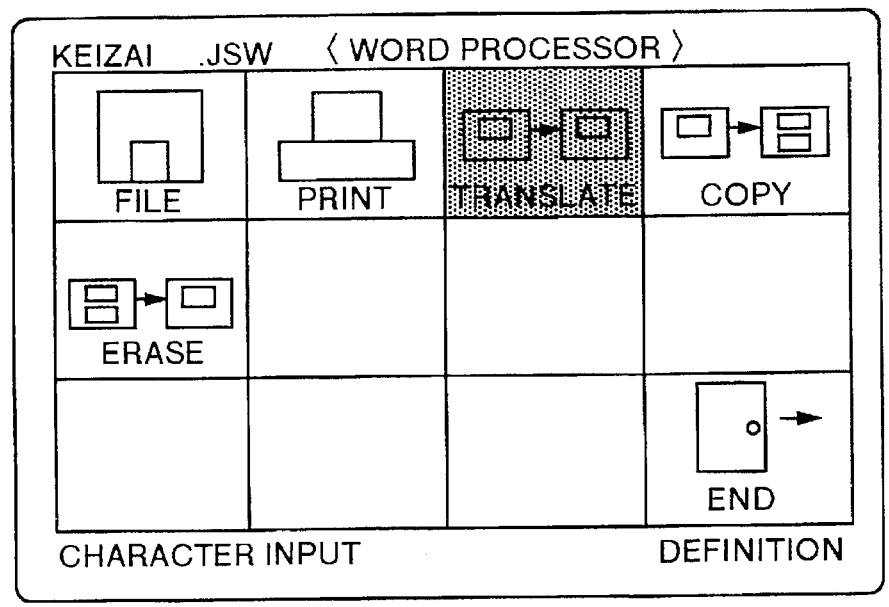
FIG. 14 shows a display screen of a word processor for an information inputting and processing apparatus of an embodiment of the present invention.

A still further embodiment will be explained with reference to FIGS. 13 and 14. FIG. 14 shows a display screen in which the word processor program is under execution. The circuit of FIG. 13, which is substantially identical with that of FIG. 1, has a key switch 18 and a keytop 19 added to the CPU 6. This key is assigned for execution of a specific function, and depression of this key during execution of the word processor program turns the display screen to the state shown in FIG. 14. Each icon is displayed in correspondence with the physical position in the horizontal and vertical directions of each key. In the process, assume that a finger is in contact with or in proximity to a key. As shown in FIG. 14, the brightness of a specific icon changes, thereby indicating that execution of a corresponding process is anticipated. A subsequent depression of the key addresses and executes an actual process.

Figure 15:
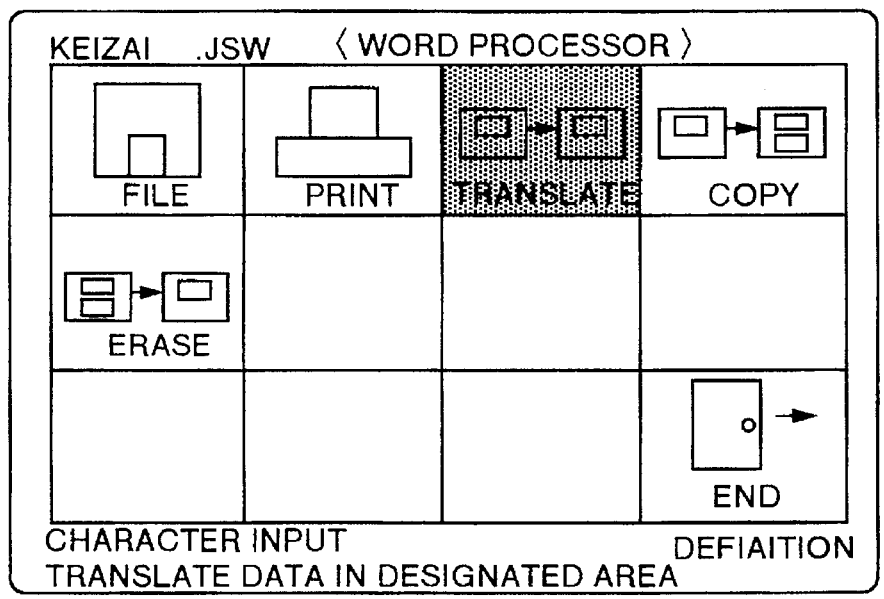
FIG. 15 shows a display screen of a word processor for an information inputting and processing apparatus of an embodiment of the present invention.

Now, yet another embodiment will be explained with reference to FIG. 15. FIG. 15 shows a display screen, in which a descriptive statement of the icon changed in color is displayed on the display screen of FIG. 14. The description of the function of each icon corresponding to the physical position of the keytop contacted is thus displayed in the lower portion.

Figure 16:
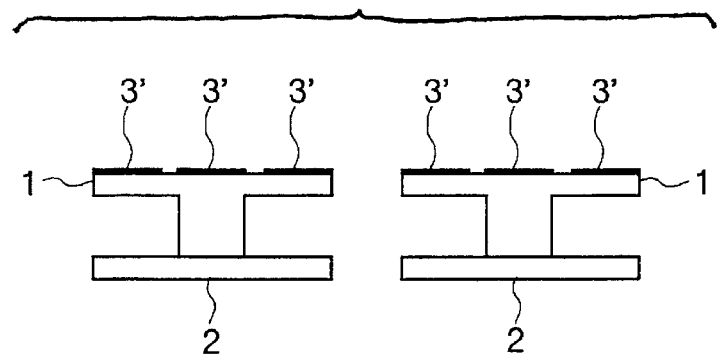
FIG. 16 shows a part of a keyboard of an information inputting and processing apparatus of an embodiment of the present invention.

A still further embodiment is shown in FIG. 16. This figure shows a part of the keyboard as viewed in the side direction. In FIG. 16, numeral 1 designates keytops, 2 a switch, and 3' small electrodes. A total of nine small electrodes are arranged in a 3-by-3 matrix on each keytop. The output of each electrode is coupled to the sensing circuit 4 shown in FIG. 1. When a finger or the like approaches from above the keytop, detailed positional information can be generated and indicated.

Figure 17:
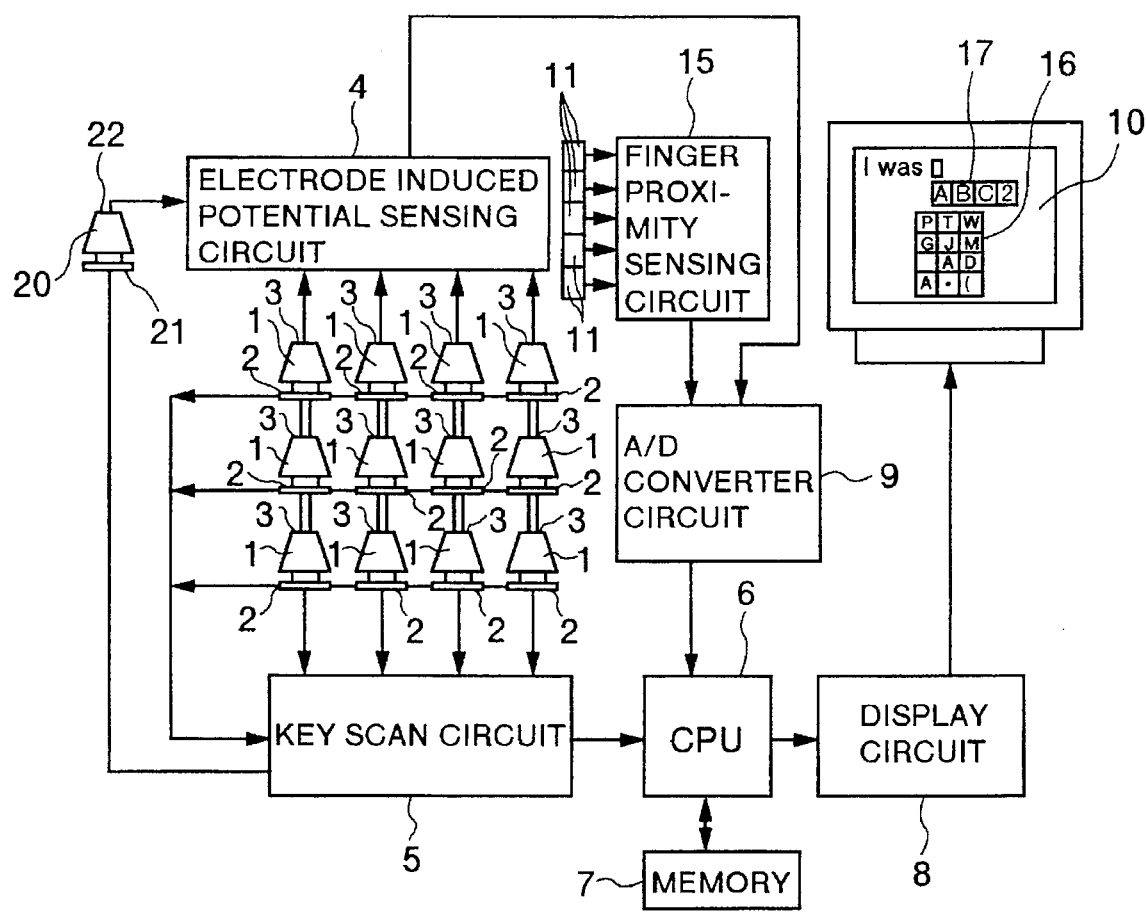
FIG. 17 is a functional block diagram of an information inputting and processing apparatus of an embodiment of the present invention.
Figure 18A:
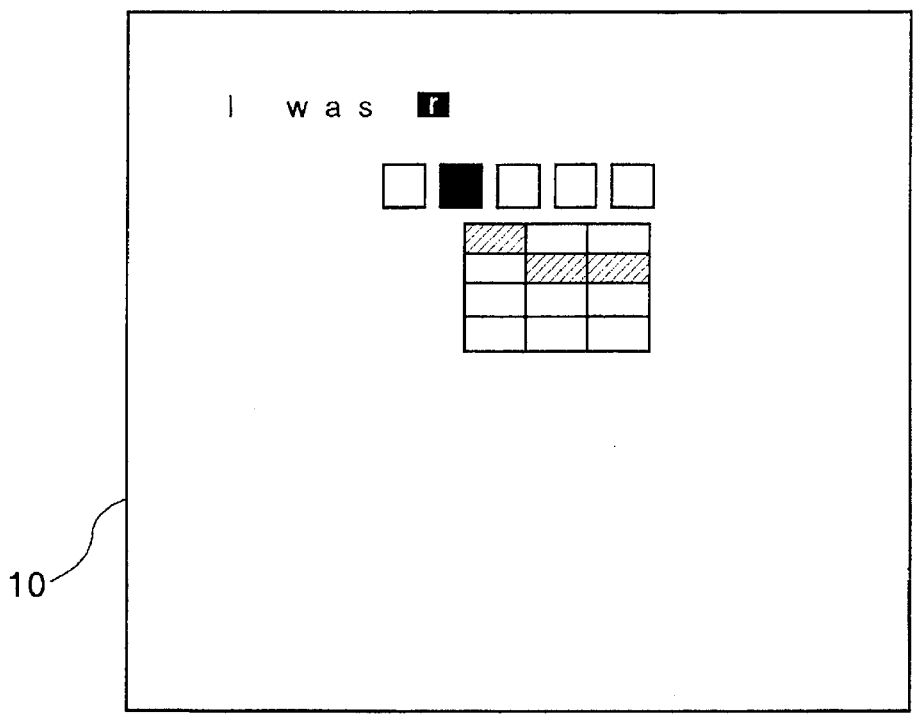
FIGS. 18A and 18B respectively show display screens of a word processor for an information inputting and processing apparatus of an embodiment of the present invention.
Figure 18B:
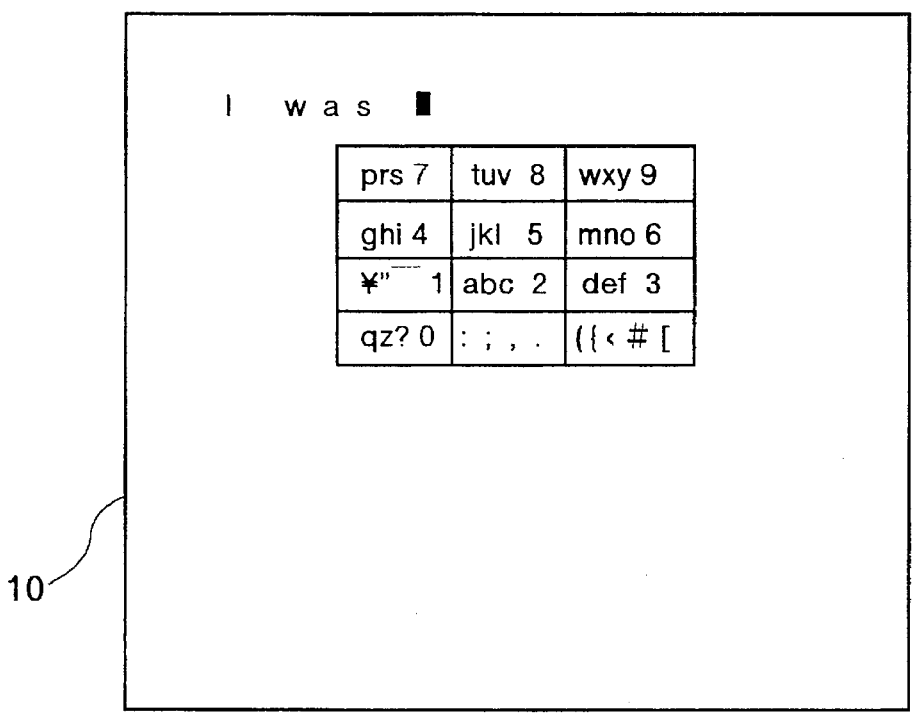

Another embodiment is shown in FIGS. 17, 18A and 18B. In the circuit of FIG. 17, numeral 20 designates a keytop, 21 a key switch and 22 an electrode of a proximity sensor. This circuit, which is substantially the same as that shown in FIG. 1, has a switch having the above-mentioned help function added thereto. This is a display change-over switch. While this switch is not depressed, as shown in FIG. 18A, the finger positions in proximity to each keytop are indicated as a bitmap combination of small spots, and the thumb position is indicated by a horizontal mark. With the approach of a finger to the proximity sensor 22, sets of characters corresponding to the keytops are displayed distinctly on the screen as shown in FIG. 18B. As a result, the operator can know the corresponding characters by bringing a finger toward the proximity sensor 22 and the keytops at the same time when he/she still could not otherwise recognize the characters on the keytops. Also, in the case where the key switch 21 is turned on, the descriptive text is displayed, thereby dividing the help function into two levels. The keytop 20 is mounted at the upper left side of the keyboard housing (for right-handed persons). This keytop 20, which is at a location difficult to reach by the right hand, is required to be depressed always by the other hand (the left hand in the case under consideration). This arrangement induces early transfer of the operator to blind touch.

Figure 19:
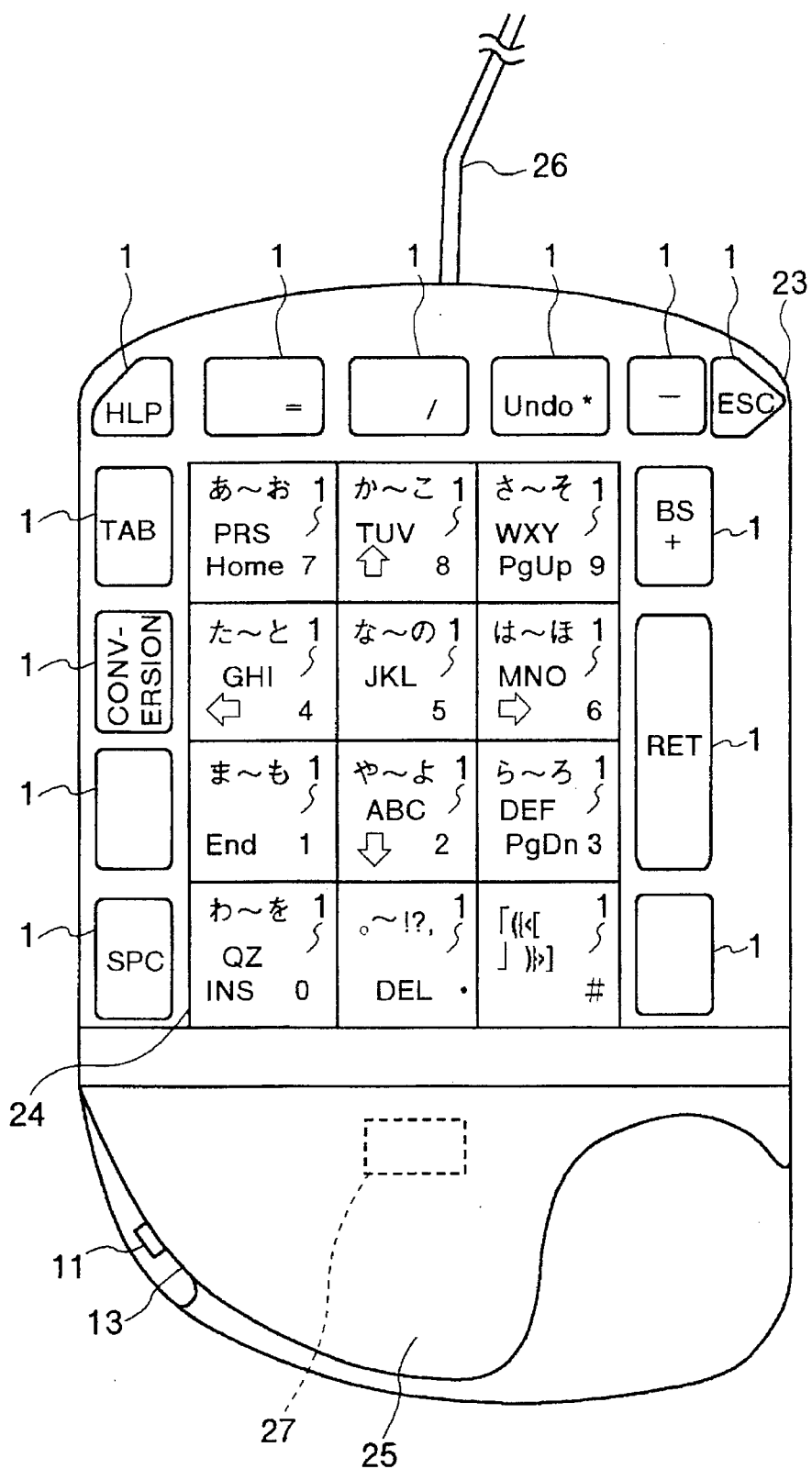
FIG. 19 is an external view of an information inputting and processing apparatus of an embodiment of the present invention.

Still another embodiment is shown in FIG. 19. In FIG. 19, numeral 23 designates a housing of the information inputting and processing apparatus for right-handed persons, and 24 a depression. A set of keytops is mounted in this depression. Another set of keytops 1 is arranged around this depression. Numeral 25 designates a palm rest with the left portion thereof raised and the right portion thereof depressed. Numeral 11 designates one of a plurality of photosensors, 13 a thumb insertion hole, and 26 an electric wire provided for communication with the microcomputer 6 of the main apparatus and for power supply to this information inputting and processing apparatus. The operator places the palm cavity of his/her right hand on the raised portion of the palm rest 25, touches the keytops in the recessed portion 1 by the forefinger, middle finger and third finger, and inserts the thumb into the thumb insertion hole 13. An acceleration sensor 27 is mounted in the lower portion of the housing in the palm rest 25 and acts as a mouse. Thus, the operator can make entry either by way of the keyboard or by pointing.

Figure 20:
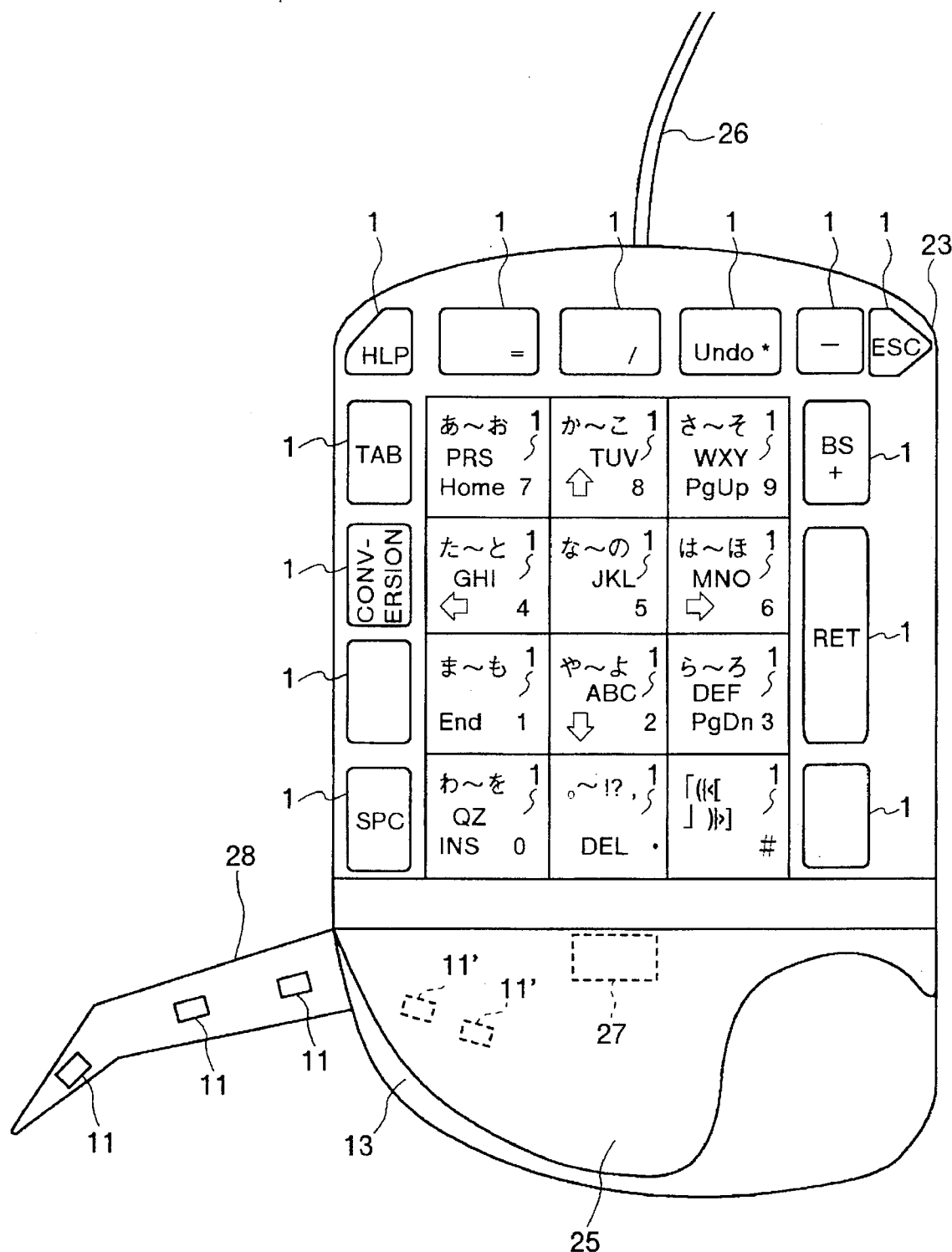
FIG. 20 is an external view of an information inputting and processing apparatus of an embodiment of the present invention.

Now, still another embodiment is shown in FIG. 20. In FIG. 20, numeral 28 designates a retractable tongue-shaped member, and numerals 11, 11' photosensors located in the thumb insertion hole 13 at the thumb position. The photosensors 11, 11' are arranged in arcuate form to fit the motion of the thumb. Numeral 27 designates the acceleration sensor mounted in the housing of the information inputting and processing apparatus. Numeral 23 designates the housing of the information inputting and processing apparatus. When the housing 23 is moved, the acceleration thereof is detected by the acceleration sensor 27 which acts as a mouse for transmitting the result of detection to an external CPU 6. The operator places his/her right hand on the palm rest 25, inserts the thumb into the insertion hole 13 or moves it arcuately along the tongue member 28, and thereby inputs the thumb position into the photosensors 11, 11'.

Figure 21:
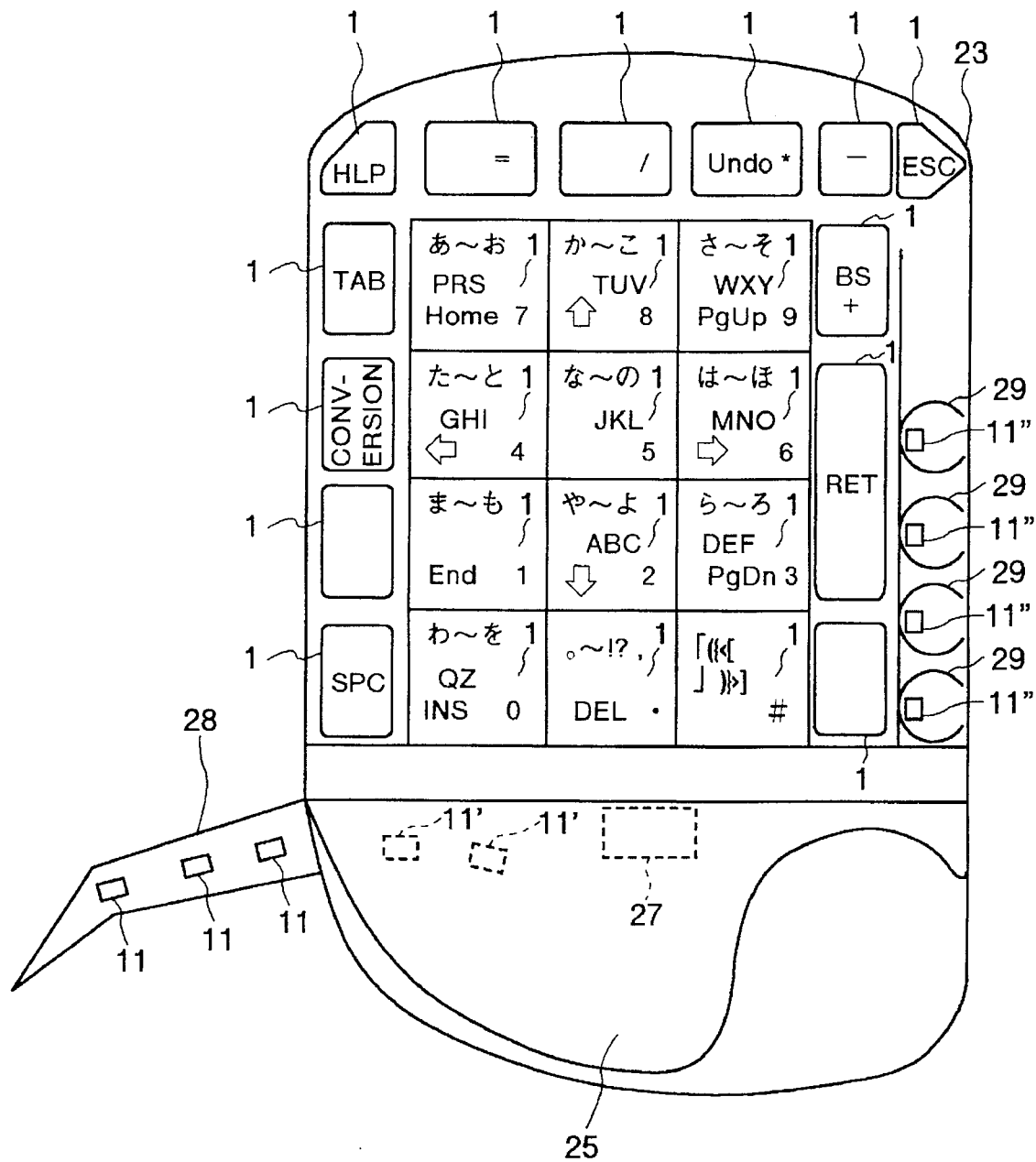
FIG. 21 is an external view of an information inputting and processing apparatus of an embodiment of the present invention.

Now, still another embodiment will be explained with reference to FIG. 21. In FIG. 21, numeral 29 designates depressions and 11" photosensors. Each depression 29 has a photosensor 11" arranged therein. The approach of the operator's little finger to a depression 29 is detected thereby to indicate a symbol corresponding to the keytop 1 as in the case of the thumb. The embodiment under consideration has the keytops 1 corresponding to shift and control keys on an ordinary type of keyboard. The position where the little finger is sensed is indicated on the display 10 by a mark representing the position of a corresponding depression 29.

Figure 22:
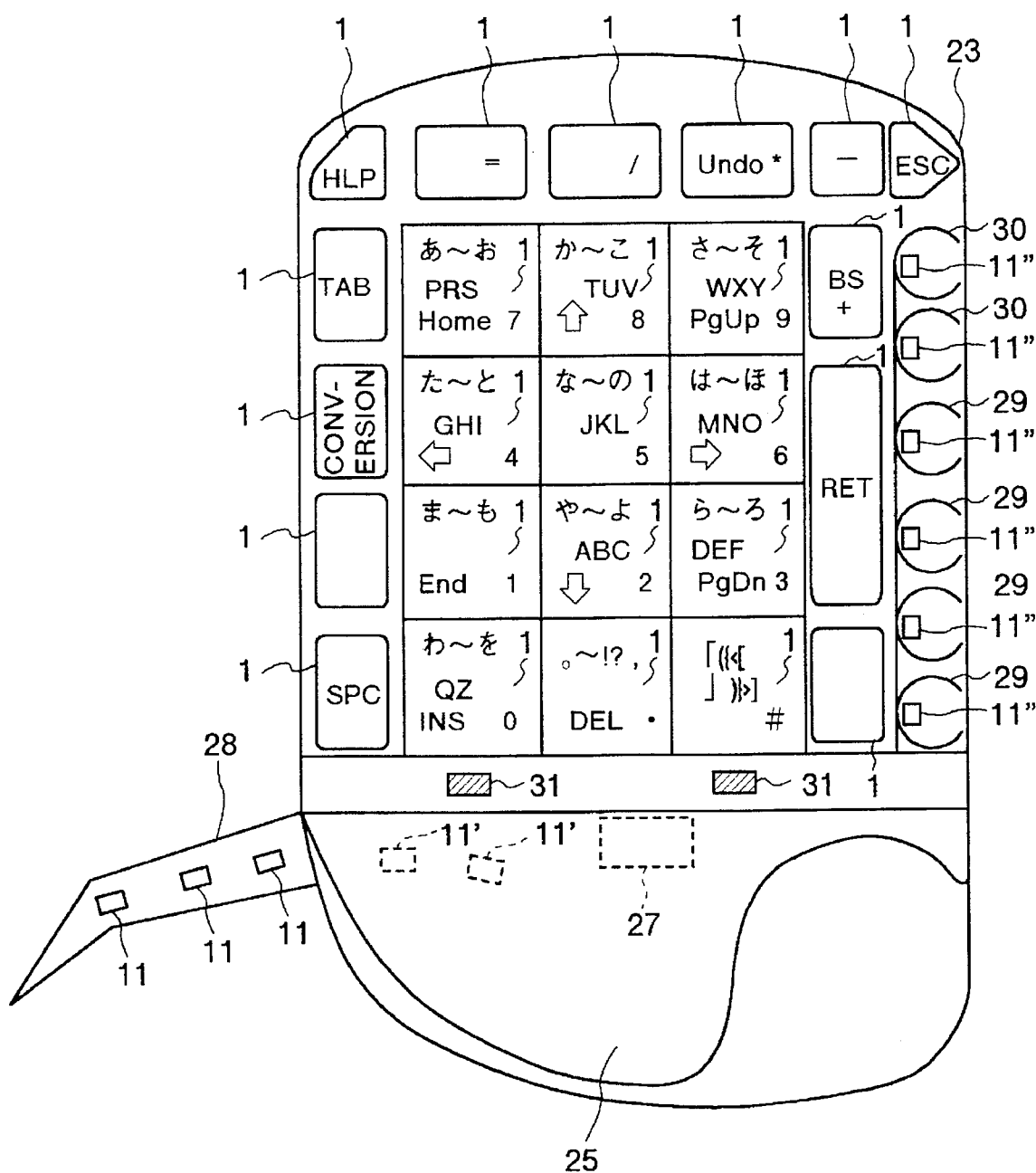
FIG. 22 is an external view of an information inputting and processing apparatus of an embodiment of the present invention.
Figure 23:
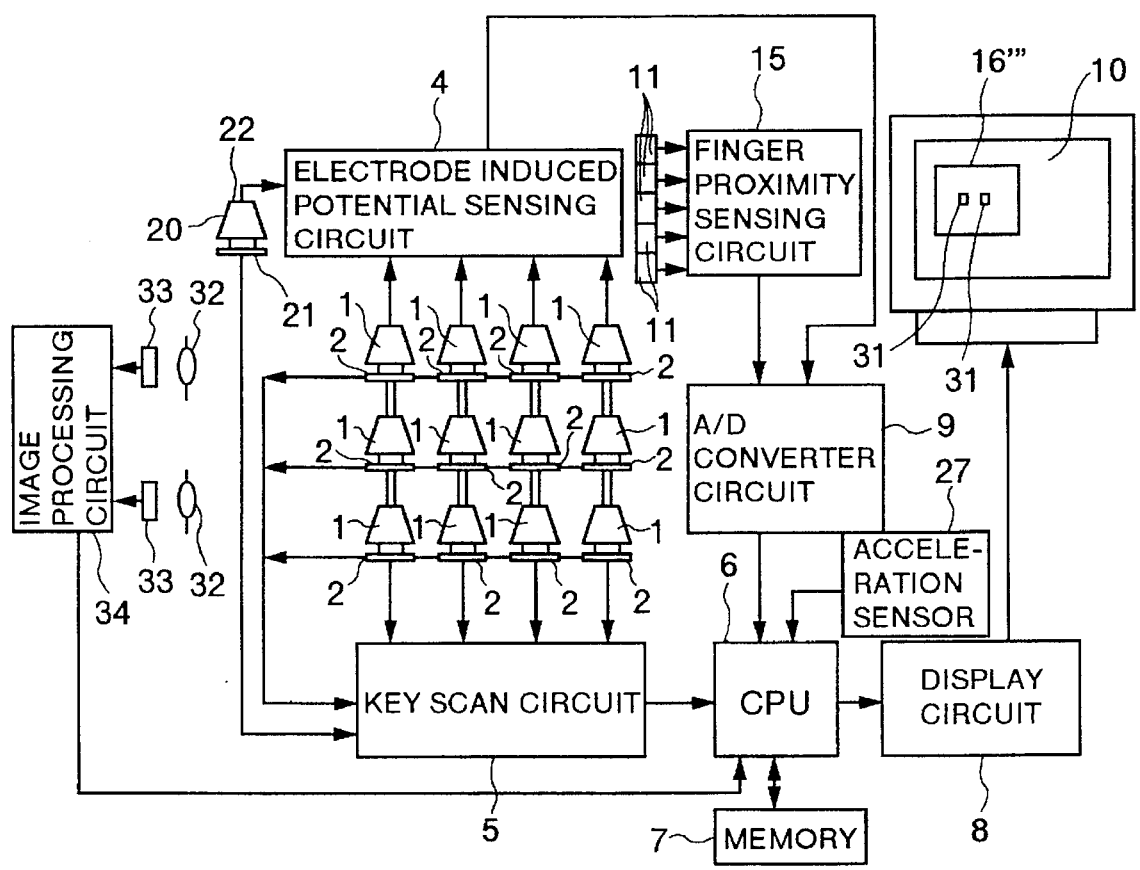
FIG. 23 is a functional block diagram showing an information inputting and processing apparatus of an embodiment of the present invention.

Another embodiment is shown in FIGS. 22 and 23. In FIG. 22, numeral 25 designates a palm rest, 29 first depressions, and 30 second depressions. Numeral 31 in FIGS. 22 and 23 designates a display cursor, and 16''' in FIG. 23 a display region corresponding to the physical position of the keytops. The palm rest 25 shown in FIG. 22 has built therein a CCD image pickup device for imaging an object on the keytops 1 through a lens 32 (shown in FIG. 23) on the display cursor 31. The depressions 30 are located above the depressions 29, and therefore are beyond the reach of the little finger when the palm is placed on the palm rest 25. As a result, the operator has no choice but to insert his/her third finger into a depression 30. Only the forefinger and the middle finger of the operator can thus touch the keytop set 1. FIG. 23 is a functional block diagram. In FIG. 23, numeral 31 designates a cursor in the display region 16''', 32 lenses, 33 CCD image pickup devices, and 34 an image processing circuit. Numeral 16''' designates a screen display corresponding to the physical position on the keytops 1. When the third finger is inserted into a depression 30 in FIG. 22, the image processing circuit 34 is activated to determine the coordinate positions of the fingers above the keytops 1 by trigonometrical survey (range finder system). In the case where two fingers are in proximity to the keytops 1, the coordinates of the two points are determined, fetched by the CPU 6 as range-defining information, and indicated on the display 10. Since two points are determined, a pattern can be specified by inserting the middle finger into a depression and bringing the thumb in proximity to the thumb sensor in similar fashion. For example, the type of pattern is selected by the thumb position, and since the positions of the two points are determined by the forefinger and the middle finger, it is possible to determine the center and radius of a circle.

Figure 24:
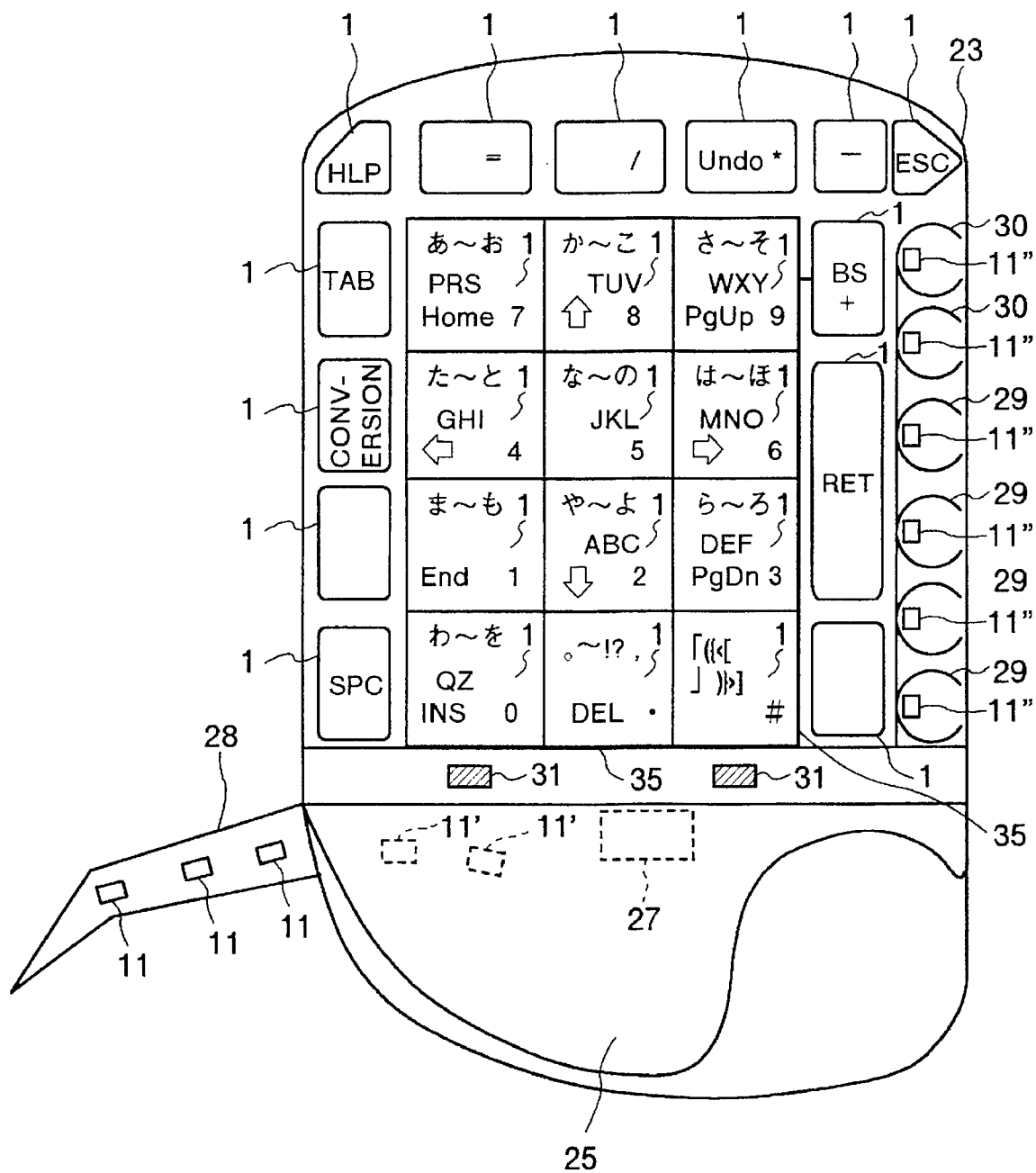
FIG. 24 is an external view of an information inputting and processing apparatus of an embodiment of the present invention.

A further embodiment will be explained with reference to FIG. 24. In FIG. 24, numeral 1 designates a set of keytops, and 35 an inclined depression formed at a level lower than the other surface areas of the housing 23. The depression 35 is progressively deeper rightward and downward in the drawing and is arranged at an angle to the keytop faces. This slope descending rightward and toward the operator snugly fits the hand profile and has the effect of saving fatigue of the operator.

Figure 25:
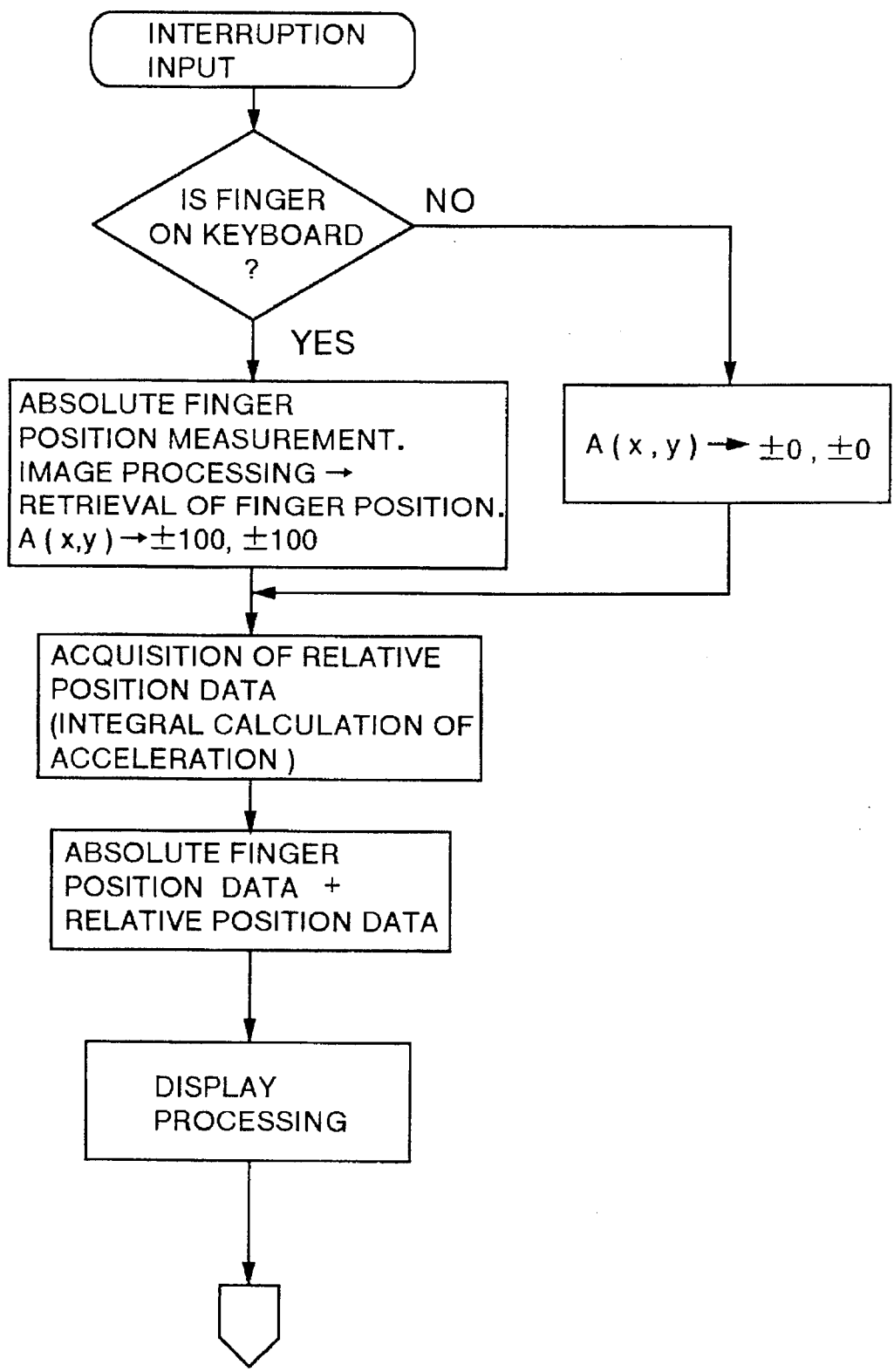
FIG. 25 shows the processing steps of a microcomputer for an information inputting and processing apparatus of an embodiment of the present invention.

A still further embodiment will be explained with reference to FIG. 25 and FIG. 23 described above. FIG. 25 is a flowchart for controlling the position of the display pointer on the display 10 by adding together the absolute position coordinates (finger positions on keytops) and the relative position coordinates (relative position of the housing) determined in the circuit shown in the block diagram of FIG. 23. More specifically, the operator depresses a switch on the housing 23 to indicate a position designation mode to the CPU and enters the interrupt process shown in FIG. 25. In other words, the operator depresses a switch on the housing 23 to inform the CPU that the position designation mode is prevailing, thereby entering the interrupt process shown in FIG. 25. The CPU 6, which receives the absolute position coordinate of the finger on the keytop 1 determined by the CCD image pickup device 33 and the image processing circuit 34 and the relative position coordinate of the palm-sized case obtained from the acceleration sensor 27, adds them and sends the resulting coordinate information to the computer proper, thereby displaying it as mouse pointer information on the display 10. The display 10 indicates the relative position information due to the acceleration sensor 27 alone as a rectangular display area representing the whole of the keytop set. As a result, when the operator moves the housing with his/her fingers placed on keytops, the mouse pointer in the rectangle moves. Upon next movement of the finger, a further moved mouse pointer is displayed in the rectangle. In this way, the operator moves the housing for a rough coordinate designation, while a detailed coordinate designation is made by moving the fingers in the indentations. Although the acceleration sensor 27 is used for detecting the relative coordinate according to this embodiment, optical means may alternatively be used for the same purpose. In such a case, the image motion obtained by imaging on the desktop surface is processed in an image processing circuit to determine the actual motion. Also, the coordinate calculation is not performed when the operator lifts the housing in which case the image may be enlarged or may blur. In other words, this apparatus can be handled with the same feeling as when a mechanical mouse is operated.

Figure 26:
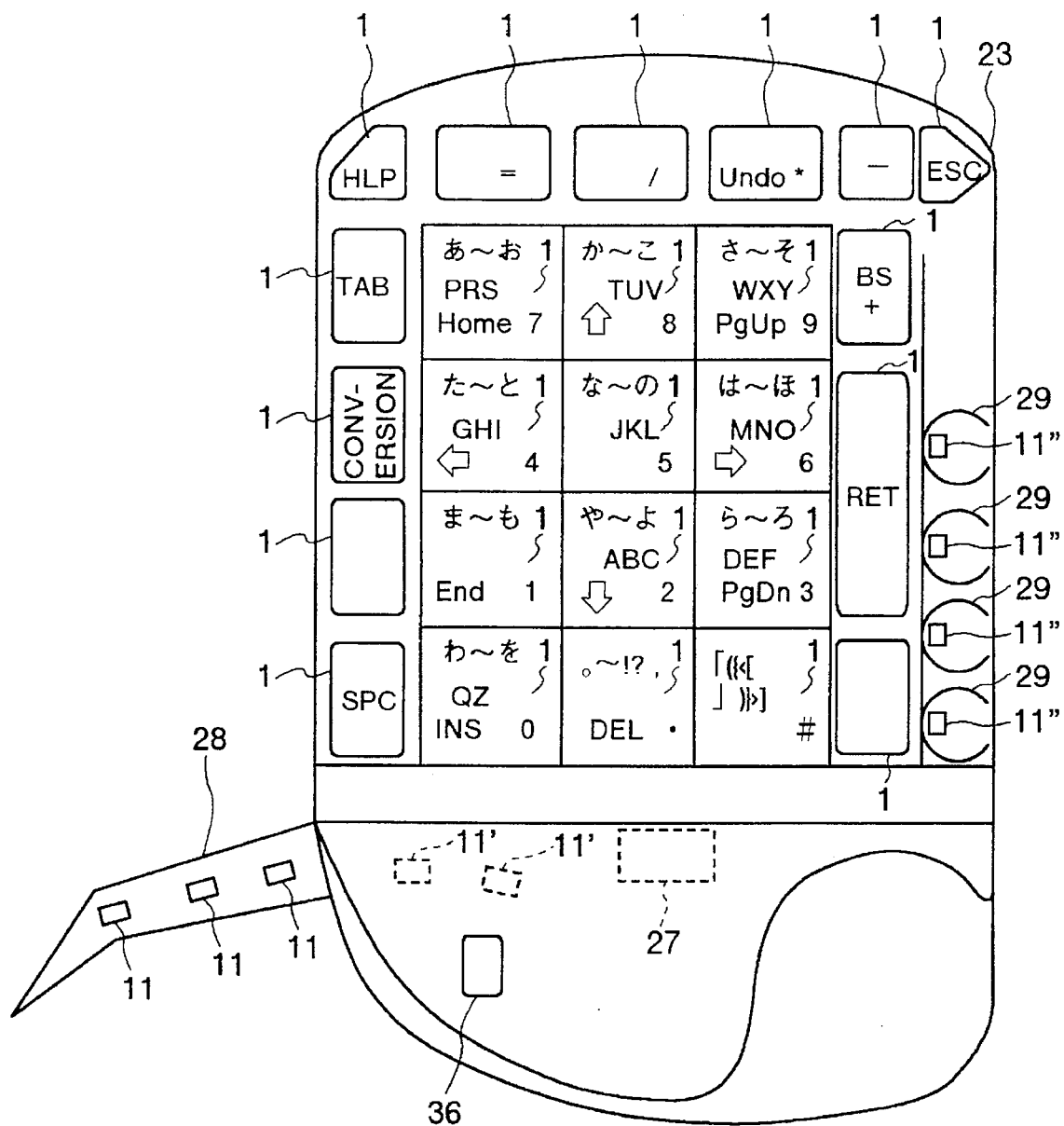
FIG. 26 is an external view of an information inputting and processing apparatus of an embodiment of the present invention.
Figure 27:
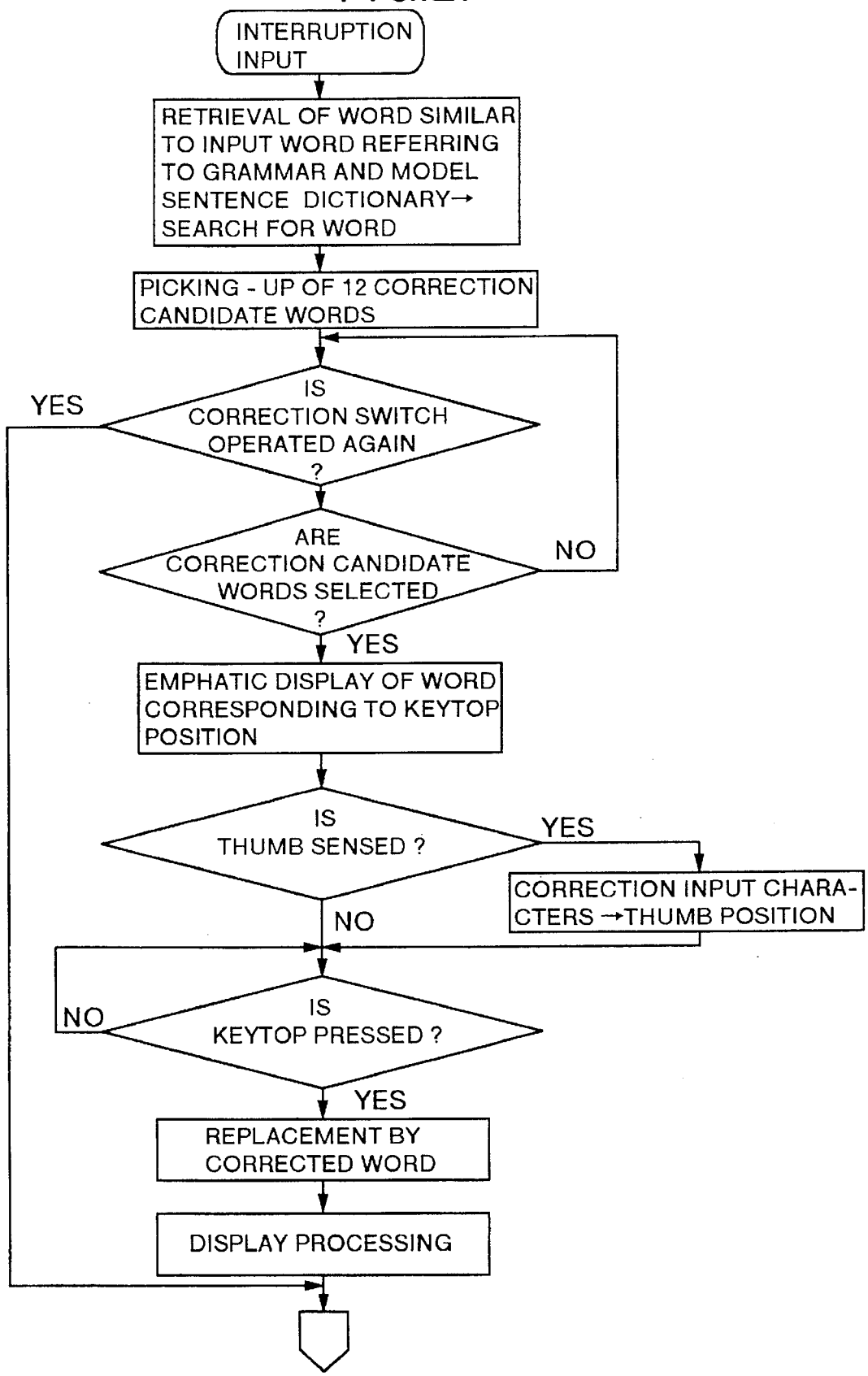
FIG. 27 shows the processing steps of a microcomputer for an information inputting and processing apparatus of an embodiment of the present invention.

Still another embodiment is shown FIGS. 26 and 27. FIG. 26 is a full view, in which numeral 36 designates a switch. FIG. 27 is a flowchart representing a part of the process for character input during the execution of a program on the word processor. This process is started when the operator depresses the correction switch 36 (arranged on the left side of the protrusion of the palm rest in FIG. 26 in the present embodiment) while a character is being inputted. In this process, the CPU decides that a word (or a partial character series of the word) already inputted is erroneous, and cites a word near the inputted word presumed as a tentative substitute by consulting a character dictionary or a grammar and model sentence dictionary. A total of 12 words (or a partial character series of a word) in four rows and three columns of the keys are displayed as tentative substitutes. Each keytop corresponds to a displayed word, and a word associated with a key to which the finger is in proximity is emphatically displayed. In this case, if the operator finds a word with which he/she wants to make correction entry, a corresponding key is depressed, thereby making correction entry of a word as required. When no selectable substitute is found, on the other hand, a correction switch 26 is operated again thereby to suspend this process. When a word on display coincides not wholly but with only a first half part thereof, the finger is touched on the corresponding keytop while bringing the thumb near the thumb sensor. Then, the first half part of the corresponding word is reversed in background in accordance with the thumb position. The thumb is slid up to the end of the coincident partial character series, and the corresponding key is operated. Though not described in the flowchart for simplicity, a substitute for the word having a subsequent portion related to the particular partial character series thus entered is additionally displayed on the screen, thereby enabling the operator to continue to input a word or a partial character series.

Figure 28:
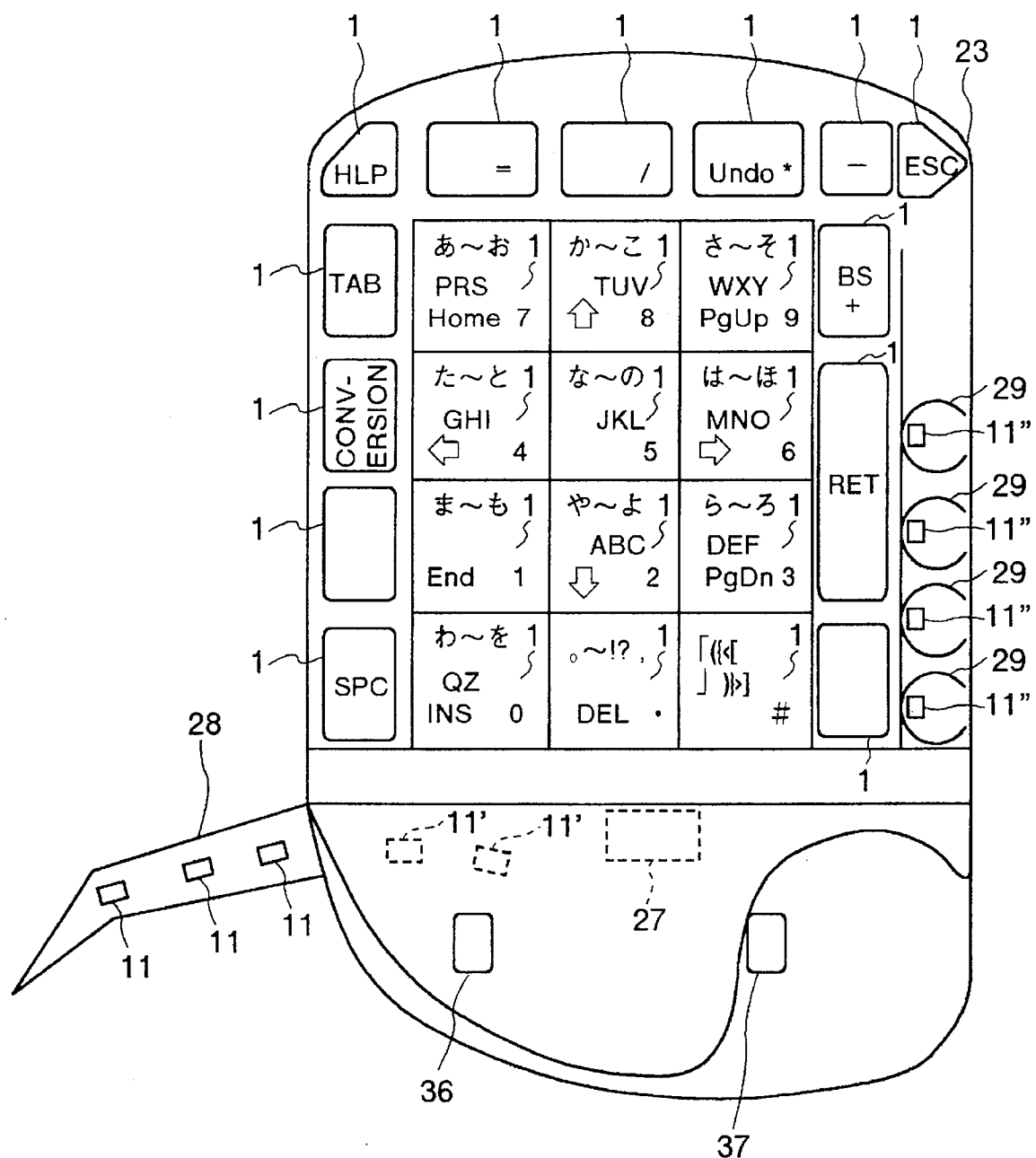
FIG. 28 is an external view of an information inputting and processing apparatus of an embodiment of the present invention.
Figure 29:
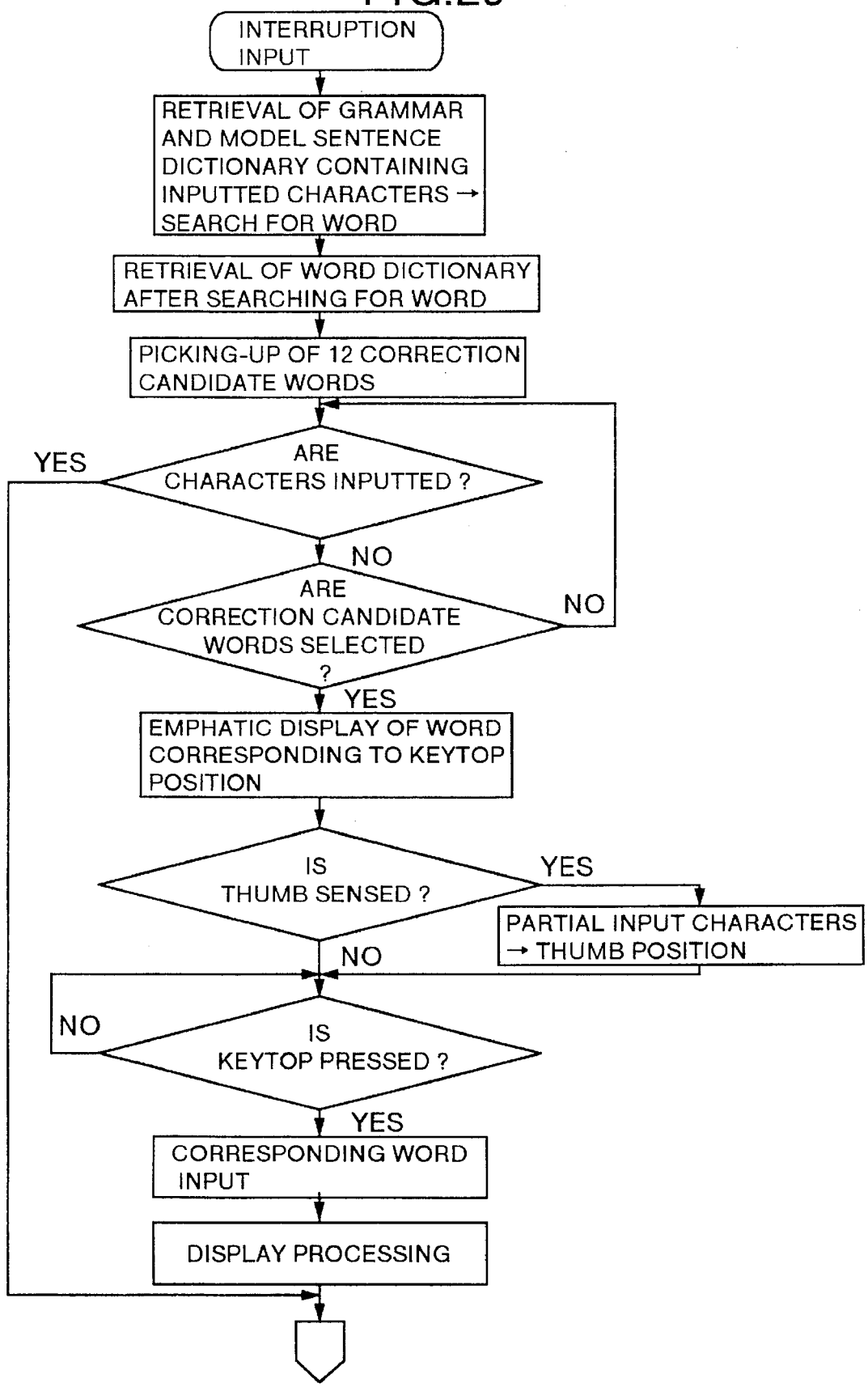
FIG. 29 shows the processing steps of a microcomputer for an information inputting and processing apparatus of an embodiment of the present invention.

Now, still another embodiment is shown in FIGS. 28, 29 and 30. FIG. 28 is an external view in which numeral 37 designates a tentative substitute word selection switch. FIG. 29 is a flowchart representing a part of the process for the character input, as a program being executed by a word processor. When the operator inputs characters, the process involved is started. The CPU 6 receives the characters, and refers them to a character dictionary containing words constituted by such characters, while, at the same time, searching a grammar and model sentence dictionary. All related words are thus obtained as tentative substitutes by making predictive interpolation. A total of 12 tentative substitute words (or a partial character series of a word) are displayed in accordance with the number of rows (4) and columns (3) of the keys. When the operator depresses the tentative substitute word selection switch 37 (arranged on the left side of the palm rest depression of the embodiment under consideration) to be turned to the side of the tentative substitute word selection mode, each key is made to correspond to the displayed words, and the words approached by the fingers are emphatically displayed. If the operator finds a word of interest, the operator depresses a corresponding key, thereby entering a required word. Also, when only a part of the word on display is coincident, the corresponding key is touched by a finger, while bringing the thumb near the thumb sensor. The thumb is slid up to the coincident partial character series. At this time, the characters are reversed in background, then the corresponding key is operated. At this time point, further tentative substitute words having the inputted partial character series are displayed on the screen, so that the operator continues to input a word or a partial character series, as the case may be. The state of display on the screen illustrating the inputting of the tentative substitutes is shown in FIG. 30. By the way, in the case where the operator does not depress the tentative substitute entry key, the ordinary character input operation is continued as usual.

It will thus be understood from the foregoing description that, according to the present invention, the following effects are obtained:

(1) Key input or position input is possible by one hand.

(2) Even when any actual keying operation is not performed, a feedback operation is performed in the form of searching for a particular key, thereby preventing a psychological burden from being imposed on the user.

(3) Keys, even if they are small in number, are easily assigned a plurality of character symbols.

In this way, the invention has a great functional effect of overcoming a difficulty encountered in the use of an information inputting apparatus.

We claim:

1. An information inputting and processing apparatus for use with a display unit, said apparatus comprising:

a plurality of switch circuits, each corresponding to one of a plurality of information symbols;

a group of keys, each for actuating one of said plurality of switch circuits upon application of an operating force thereon;

a group of sensors, each for sensing a selected one of finger contact with and finger proximity to one of said group of keys;

signal processing means for receiving information from said sensors and said plurality of switch circuits and processing said information to produce an output;

information symbol display means, receiving said output, for displaying on said display unit a first one of said plurality of information symbols corresponding to one of said plurality of switch circuits which is actuated; and apposition aid display means for displaying on said display unit, after said first one of said plurality of information symbols is displayed, a second one of said plurality of information symbols corresponding to a specific one of said group of keys with which a finger of a user is in said selected one of finger contact and finger proximity prior to actuation of one of said plurality of switch circuits corresponding to said specific one of said group of keys;

wherein, subsequent to a display on said display unit of said second one of said plurality of information symbols by said apposition aid display means, when a further operating force is applied to the one of said group of keys to actuate the corresponding one of said plurality of switch circuits, said information symbol display means displays the second one of the plurality of information symbols at a position on said display unit where said second one of said plurality of information symbols has been displayed by said apposition aid display means, wherein each of said plurality of information symbols comprises a first form for display on said display unit by said information symbol display means; and a second form for display on said display unit by said apposition aid display means, wherein said first form has a first color; and said second form has a second color different from said first color.

2. An information inputting and processing apparatus for use with a display unit, said apparatus comprising:

a plurality of switch circuits, each corresponding to one of a plurality of information symbols;

a group of keys, each for actuating one of said plurality of switch circuits upon application of an operating force thereon;

sensor circuit means, each for detecting a selected one of finger contact with and a degree of finger proximity to one of said group of keys to obtain a detection value;

information symbol display means for displaying, on said display unit, a first one of the plurality of information symbols corresponding to one of the plurality of switch circuits which is actuated;

information processing means for processing a selected one of the detection value obtained by each of said sensor circuit means and a change in time of said detection value and for making one of a determination and a prediction of a selected one of intentional finger proximity to and intentional finger contact with a specific one of said group of keys to identify a second one of said plurality of information symbols corresponding to said specific one of said group of keys; and apposition aid display means for displaying, on said display unit, after said first one of said plurality of information symbols is displayed, said second one of said plurality of information symbols prior to actuation of said specific one of said group of keys, and wherein:

when said specific one of said group of keys is actuated, said information symbol display means displays said second one of said plurality of information symbols at a position on said display unit where said second one of said plurality of information symbols has been displayed by said apposition aid display means, and each of said plurality of information symbols comprises a first form for display on said display unit by said information symbol display means; and a second form for display on said display unit by said apposition aid display means, wherein said first form has a first color; and said second form has a second color different from said first color.

* * * * *